US012053987B2

(12) United States Patent
Kanahara et al.

(10) Patent No.: US 12,053,987 B2
(45) Date of Patent: Aug. 6, 2024

(54) WASTE LIQUID CONTAINER AND LIQUID EJECTING APPARATUS

(71) Applicant: SEIKO EPSON CORPORATION, Tokyo (JP)

(72) Inventors: Shunsuke Kanahara, Okaya (JP); Takayoshi Mizuno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 17/814,879

(22) Filed: Jul. 26, 2022

(65) Prior Publication Data

US 2023/0032588 A1 Feb. 2, 2023

(30) Foreign Application Priority Data

Jul. 29, 2021 (JP) ................................ 2021-124150

(51) Int. Cl.
*B41J 2/165* (2006.01)

(52) U.S. Cl.
CPC ................................ *B41J 2/16517* (2013.01)

(58) Field of Classification Search
CPC .......... B41J 2/16517; B41J 2002/16594; B41J 2/16508; B41J 2/16523; B41J 2/16532; B41J 2/1721

See application file for complete search history.

(56) References Cited

U.S. PATENT DOCUMENTS

| | | | | |
|---|---|---|---|---|
| 6,361,142 | B1 * | 3/2002 | Otsuka .................. | B41J 2/1721 347/31 |
| 2005/0001874 | A1 | 1/2005 | Gotoh et al. | |
| 2008/0297575 | A1 * | 12/2008 | Asaki .................. | B41J 2/16505 347/86 |
| 2009/0231388 | A1 * | 9/2009 | Osumi ................ | B41J 2/16523 347/36 |

FOREIGN PATENT DOCUMENTS

| | | |
|---|---|---|
| JP | 2004-34412 A | 2/2004 |

* cited by examiner

*Primary Examiner* — Sharon Polk
(74) *Attorney, Agent, or Firm* — WORKMAN NYDEGGER

(57) ABSTRACT

A waste liquid container for collecting waste liquid ejected from a liquid ejection head that ejects liquid, including a receiving member that has a receiving surface on which the waste liquid drips and a waste liquid absorbing member configured to absorb the waste liquid, wherein the waste liquid is flowable over the receiving surface and the receiving surface has a surface energy distribution for flowing the waste liquid to the waste liquid absorbing member.

6 Claims, 15 Drawing Sheets

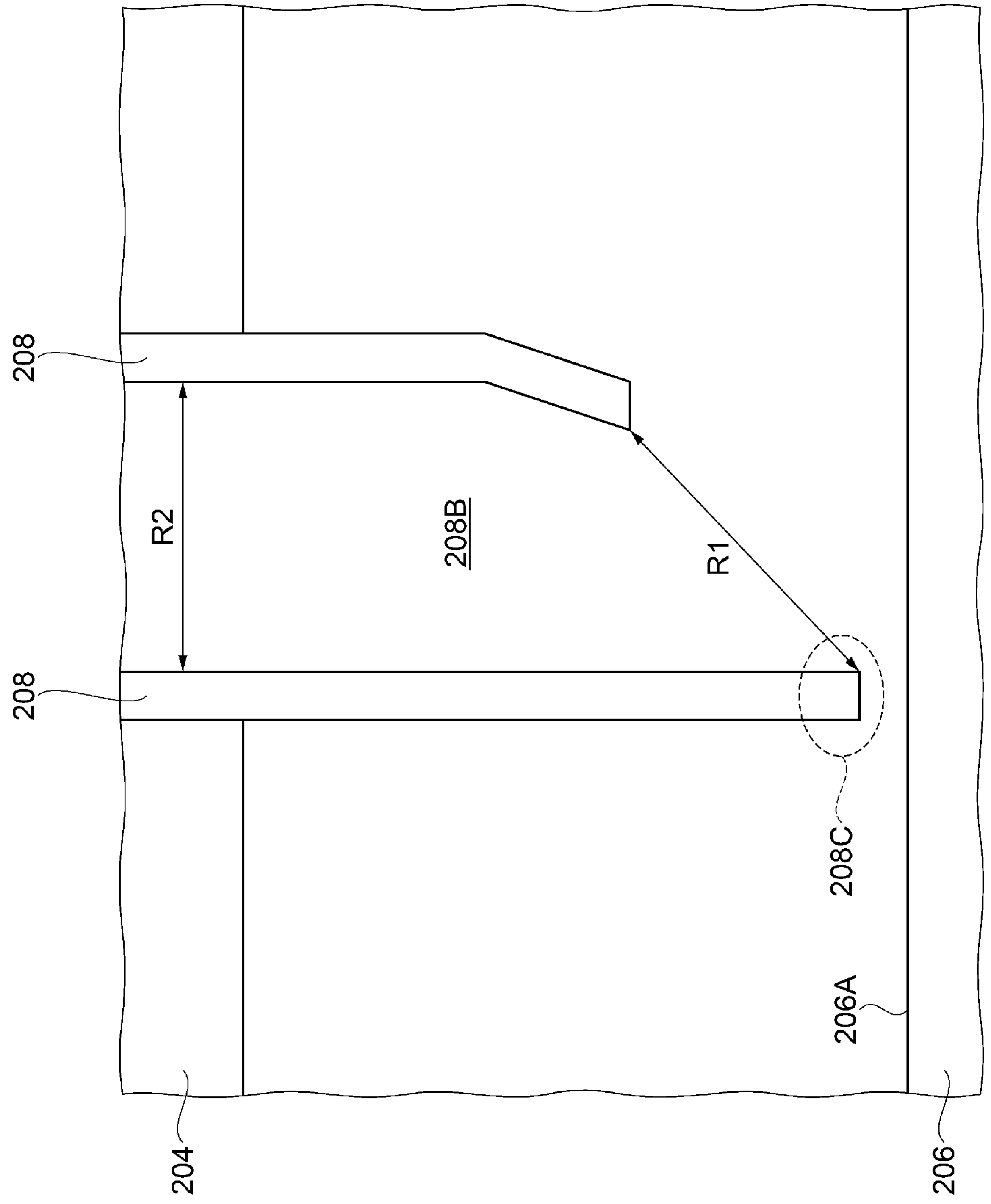
FIG. 15
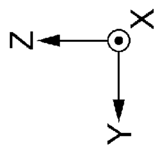

WASTE LIQUID CONTAINER AND LIQUID EJECTING APPARATUS

The present application is based on, and claims priority from JP Application Serial Number 2021-124150, filed Jul. 29, 2021, the disclosure of which is hereby incorporated by reference herein in its entirety.

BACKGROUND

1. Technical Field

The present disclosure relates to a waste liquid container and a liquid ejecting apparatus.

2. Related Art

There is known a waste ink storage device that stores waste ink by absorbing the waste ink in a waste ink absorbing pad. The waste ink storage device of JP-A-2004-34412 is provided with a protrusion on the bottom surface of the waste ink container. Since the protrusion disperses the waste ink, the waste ink storage device facilitates absorption of the waste ink in the waste ink absorbing pad.

However, when the protrusion is provided on the bottom surface of the waste ink container, the waste ink container becomes large in order to secure a waste ink storage amount.

SUMMARY

According to the present disclosure, a waste liquid container for collecting waste liquid ejected from a liquid ejection head that ejects liquid, includes a receiving member that has a receiving surface on which the waste liquid drips and a waste liquid absorbing member configured to absorb the waste liquid, wherein the waste liquid is flowable over the receiving surface and the receiving surface has a surface energy distribution for flowing the waste liquid to the waste liquid absorbing member.

Note that the "surface energy distribution for flowing the waste liquid to the waste liquid absorbing member" means a surface energy distribution in which the waste liquid can flow directly or indirectly to the waste liquid absorbing member.

According to the present disclosure, a liquid ejecting apparatus includes a liquid ejection head that ejects liquid and a waste liquid container for collecting waste liquid ejected from the liquid ejection head, wherein the waste liquid container includes a receiving member that has a receiving surface on which the waste liquid drips and a waste liquid absorbing member configured to absorb the waste liquid, the waste liquid is flowable over the receiving surface and the receiving surface has a surface energy distribution for flowing the waste liquid to the waste liquid absorbing member.

BRIEF DESCRIPTION OF THE DRAWINGS

FIG. 15 is an enlarged view of a tip structure of a flow path tube.

DESCRIPTION OF EMBODIMENTS

1. Configuration of Printer 10

Figure 1:
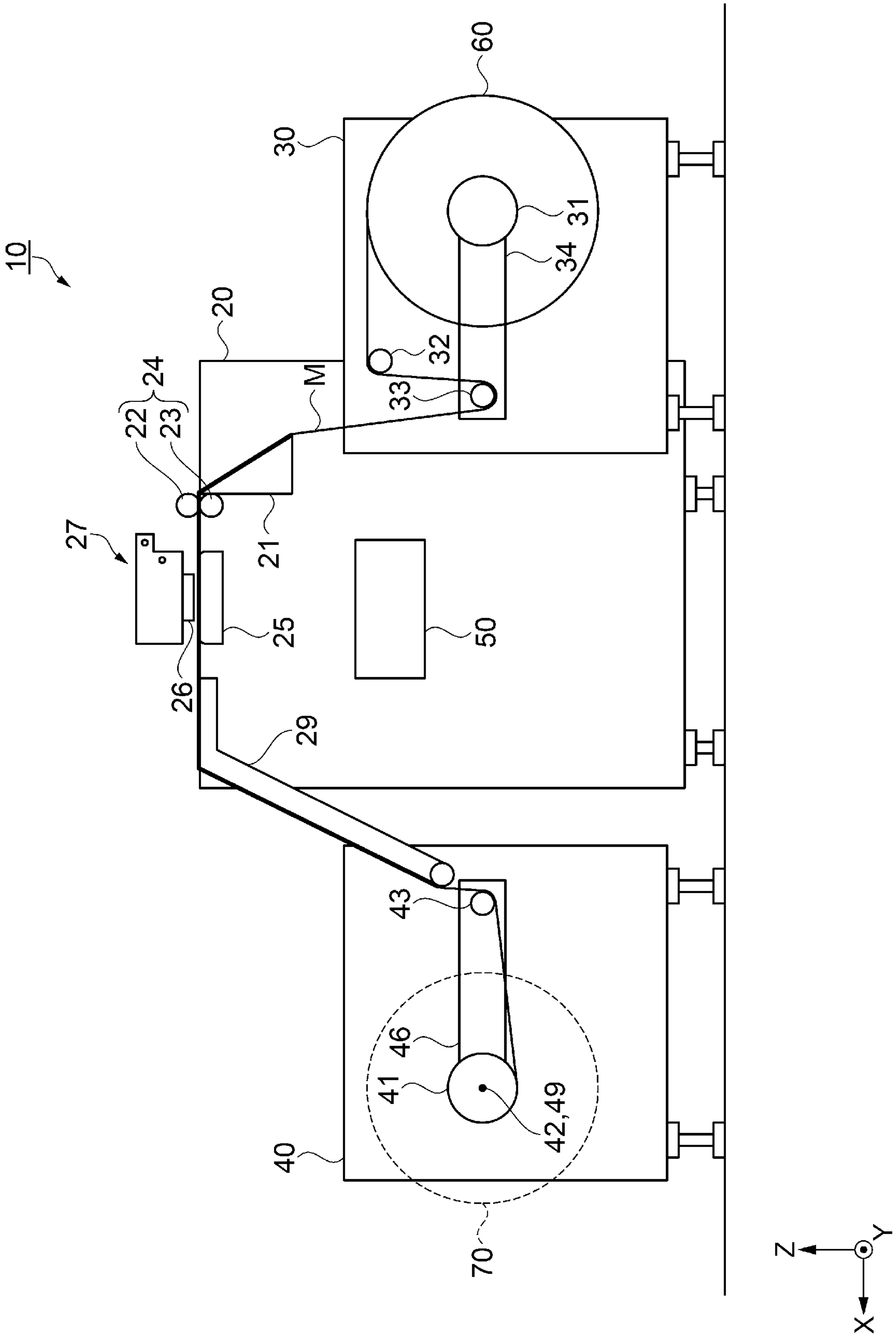
FIG. 1 is a schematic cross-sectional view showing configuration of a printer.

FIG. 1 is a schematic cross-sectional view showing configuration of a printer 10. The printer 10 is an ink jet printer that performs printing by ejecting ink onto a medium M. The printer 10 includes a printing unit 20, a supply unit 30 that feeds out the medium M, a medium winding unit 40, and a collection container 200, to be described later. The printer 10 corresponds to an example of a liquid ejecting apparatus. The ink corresponds to an example of a liquid.

FIG. 1 and the like show an XYZ coordinate system. The X axis, the Y axis, and the Z axis are orthogonal to each other. The X-axis is parallel to the installation surface of the printer 10 and corresponds to the width of the printer 10. The Y axis is parallel to the installation surface of the printer 10, and corresponds to the depth of the printer 10. The Z axis is perpendicular to the installation surface of the printer 10, and corresponds to the height of the printer 10.

Hereinafter, the +X direction, which is parallel to the X axis, indicates a direction from the supply unit 30 toward the medium winding unit 40, and indicates a direction from the center toward the left in the drawing. The −X direction of the X axis indicates a direction from the center to the right in the drawing. The +Y direction, which is parallel to the Y axis, indicates a direction toward the front of the drawing. The −Y direction, which is parallel to the Y axis, indicates a direction toward the back of the drawing. The +Z direction, which is parallel to the Z axis, indicates a direction directed upward from the center of the drawing. The −Z direction, which is parallel to the Z axis, indicates a direction downward from the center of the drawing.

The printing unit 20 includes a supply guide frame 21, a transport roller pair 24 including a first transport roller 22 and a second transport roller 23, a platen 25, a print head 26, a carriage 27, a discharge guide frame 29, and a control unit 50.

The supply guide frame 21 guides the medium M that was fed out from the supply unit 30 to the transport roller pair 24. The supply guide frame 21 guides the medium M in an oblique direction intersecting the +X direction and the +Z direction. The supply guide frame 21 may be constituted by one member or may be constituted by a plurality of members.

The transport roller pair 24 includes the first transport roller 22 and the second transport roller 23, and is capable of transporting the medium M. The first transport roller 22 is disposed at a position in the +Z direction with respect to the medium M. The second transport roller 23 is disposed at a position in the −Z direction with respect to the medium M. The first transport roller 22 or the second transport roller 23 is rotationally driven by a driving force from a driving source such as a motor (not shown). The first transport roller 22 and the second transport roller 23 transport the medium M to the print head 26 by the driving force from the driving source, in a state of sandwiching the medium M by pressing against each other.

The platen 25 is provided at a position in the −Z direction from the print head 26. The platen 25 is a flat plate-shaped member that supports the medium M transported by the transport roller pair 24. In a case where a suction fan is provided at a position in the −Z direction with respect to the platen 25, the platen 25 is provided with a through hole through which an air current flows. The medium M is drawn toward the platen 25 by the air flow of the suction fan.

The print head 26 has a plurality of nozzles (not shown). The plurality of nozzles can perform printing by ejecting ink onto the medium M supported by the platen 25. The print head 26 forms an image on the medium M by ejecting ink. The print head 26 corresponds to an example of a liquid ejection head.

The carriage 27 supports the print head 26. The carriage 27 moves along an axis parallel to the Y-axis. The carriage 27 transports the print head 26 to a capping unit 102, to be described later.

The discharge guide frame 29 guides the medium M printed on by the print head 26, to the medium winding unit 40. The discharge guide frame 29 guides the medium M in an oblique direction intersecting the +X direction and the −Z direction. The discharge guide frame 29 may be formed of one member or may be formed of a plurality of members.

A drying unit (not shown) may be provided at a position facing the discharge guide frame 29. The drying unit includes, for example, a heater as a heating source. The drying unit heats the medium M on the discharge guide frame 29 and promotes fixing of the ejected ink to the medium M.

The control unit 50 is a controller that performs various types of control such as transport control of the medium M and print control on the medium M. The controller includes a central processing unit (CPU), read only memory (ROM), random access memory (RAM), and storage, none of which are shown. The control unit 50 acquires detection results from various sensors (not shown) and performs various controls. The control unit 50 may acquire print data and perform various controls based on the acquired print data. The control unit 50 may be composed of one or more units.

The supply unit 30 includes a medium roll support shaft 31, a supply guide member 32, a supply bar member 33, and supply bar support members 34. A medium roll 60 of the medium M wound in a roll shape is supplied to the supply unit 30.

The medium roll support shaft 31 supports the medium roll 60. The medium roll support shaft 31 is rotatably supported by a frame or the like (not shown) disposed at an end portion in the +Y direction and an end portion in the −Y direction with respect to the supply unit 30. The medium roll support shaft 31 may be rotated by driving force of a driving source such as a motor (not shown). When the medium roll support shaft 31 is rotated by the driving force of the driving source, the rotation amount is controlled by the control of the control unit 50.

The supply guide member 32 guides the medium M fed out from the medium roll 60. The supply guide member 32 guides the medium M in the +X direction and the −Z direction. The supply guide member 32 is, for example, a roll member. The roll member may be supported so as to be rotatable or may be non-rotatably supported. In order to increase the slidability of the medium M, it is desirable that the roll member is rotatably supported.

The supply bar member 33 is supported by the supply bar support members 34. The supply bar member 33 is wrapped around by the medium M guided by the supply guide member 32 and applies tension to the medium M. The supply bar member 33 guides the medium M to the transport roller pair 24 via the supply guide frame 21. The supply bar member 33 guides the medium M in the +Z direction.

The supply bar support members 34 are disposed at an end portion in the +Y direction and an end portion in the −Y direction of the supply unit 30 so as to sandwich the supply bar member 33. The supply bar support members 34 swingably support the supply bar member 33. The supply bar support members 34 swing the supply bar member 33 about a virtual supply bar swing axis (not shown). In the case of FIG. 1, the supply bar swing axis coincides with the rotation axis (not shown) of the medium roll support shaft 31. The supply bar swing axis may not coincide with the rotation axis. The supply bar support members 34 apply tension to the medium M by swinging the supply bar member 33. The supply bar support members 34 apply tension to the medium M.

The medium winding unit 40 includes a medium winding member 41, a tension bar 43, and a tension bar support member 46. The medium winding unit 40 winds the medium M which was printed on by the printing unit 20.

FIG. 1 shows a winding member rotation axis 42, which is the rotation center of the medium winding member 41, and a tension bar swing axis 49, which is the swing center of the tension bar support member 46. The winding member rotation axis 42 and the tension bar swing axis 49 are virtual shafts and are parallel or substantially parallel to the Y axis. The winding member rotation axis 42 and the tension bar swing axis 49 may deviate within the range of design error.

The medium winding member 41 is capable of winding up the printed medium M. The medium winding member 41 is rotatable about the winding member rotation axis 42. The medium winding member 41 supports the printing medium roll 70 on which the medium M printed by the printing unit 20 is wound. The print medium roll 70 of FIG. 1 shows a virtual state of the medium M being wound up. The medium winding member 41 is rotatably supported by a frame or the like (not shown) disposed at an end portion in the +Y direction and at an end portion in the −Y direction of the medium winding unit 40. The medium winding member 41 is rotated by a driving force from a driving source such as a motor (not shown), and winds up the medium M.

Of the medium M, the printing surface printed by the print head 26 wraps around the tension bar 43. The tension bar 43 presses the printing surface of the medium M by its own weight. The tension bar 43 may press against the printing surface of the medium M using the rotation of the medium winding member 41 as a driving force.

The tension bar support member 46 is supported by a frame or the like disposed at an end portion in the +Y direction and an end portion in the −Y direction of the medium winding unit 40. The tension bar support member 46 supports the tension bar 43. The tension bar support member 46 is swingable about the tension bar swing axis 49.

2. Configuration of Waste Liquid Collection System 100

Figure 2:
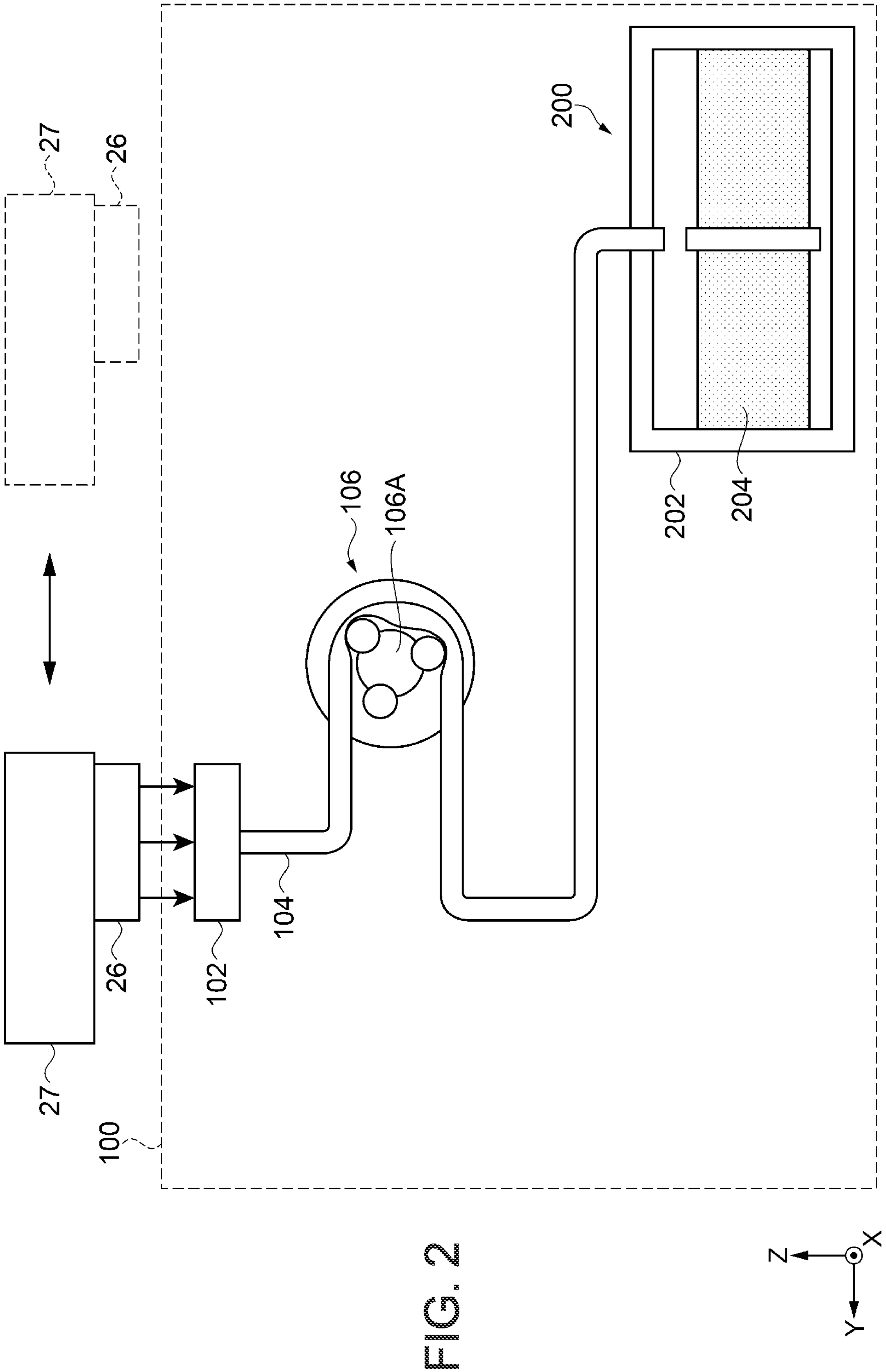
FIG. 2 is a partial vertical cross-sectional view showing a waste liquid collection system.

FIG. 2 is a partial vertical cross-sectional view showing a waste liquid collection system 100. The waste liquid collection system 100 collects the ink ejected by the print head 26 into the collection container 200.

The waste liquid collection system 100 includes a capping unit 102, a tube 104, a roller pump 106, and a collection container 200. The capping unit 102 and the roller pump 106 are provided in the printing unit 20. The collection container 200 may be provided in the printing unit 20 or may be provided in a collection unit (not shown) separate from the printing unit 20.

The print head 26 is moved between a printing position and a standby position by the carriage 27. The printing position is a position at which ink is ejected onto the medium M. The standby position is a position facing the capping unit 102.

When the print head 26 is at the standby position, the capping unit 102 suctions the plurality of nozzles provided in the print head 26 all at once. The capping unit 102 suctions ink from the plurality of nozzles. The suctioned ink corresponds to an example of waste liquid. By the capping unit 102 suctioning the ink, clogging of the nozzles can be prevented.

The tube 104 is a conduit that guides the ink sucked by the capping unit 102 to the collection container 200. The tube 104 is connected to the capping unit 102 and the collection container 200. The tube 104 has flexibility.

The roller pump 106 is disposed between the capping unit 102 and the collection container 200. The roller pump 106 contacts a portion of the tube 104. The roller pump 106 has a rotating roller section 106A. The roller section 106A compresses the tube 104 by rotating. The roller pump 106 creates a suction force at the capping unit 102 by partially creating a vacuum within the tube 104. By the roller section 106A continuing to rotate, the roller pump 106 can feed the ink clinging to the nozzles to the collection container 200.

The collection container 200 includes a housing 202 and an absorber 204 disposed in the housing 202. The collection container 200 is connected to the tube 104, and collects the ink flowing in the tube 104. The ink flowing in the tube 104 drips onto a surface in the collection container 200. The surface in the collection container 200 receives the dripping ink. The dripping ink flows over the surface in the collection container 200, which received the ink, toward the absorber 204. The flowing ink is absorbed by the absorber 204. The collection container 200 corresponds to an example of a waste liquid container. The absorber 204 corresponds to an example of a waste liquid absorbing member. The surface on which the ink flows corresponds to an example of a receiving surface. The receiving surface is a surface that receives ink that dripped from the tube 104. The detailed configuration of the collection container 200 will be described later.

The housing 202 is formed of a hydrophobic resin having high hydrophobicity. The hydrophobic resin is a polyolefin resin such as a polyethylene resin or a polypropylene resin, an ABS resin, or the like. By forming the housing 202 from a hydrophobic resin, it is possible to prevent ink from clinging to the housing 202. The housing 202 may have a rectangular parallelepiped shape or a cylindrical shape.

The absorber 204 absorbs ink that dripped into the collection container 200. The absorber 204 holds the absorbed ink. The absorber 204 is made of nonwoven fabric, sponge material, or the like.

3. Surface Modification Method

In this embodiment, the receiving surface that receives the ink that dripped in the collection container 200 is subjected to surface modification. By performing the surface modification on the receiving surface, the surface energy of the receiving surface changes. When surface energies at two different positions on the receiving surface are different from each other, the measurer determines that the receiving surface has a surface energy distribution. The surface energy distribution indicates that there is a difference in surface energy within the surface of the receiving surface.

Figure 3:
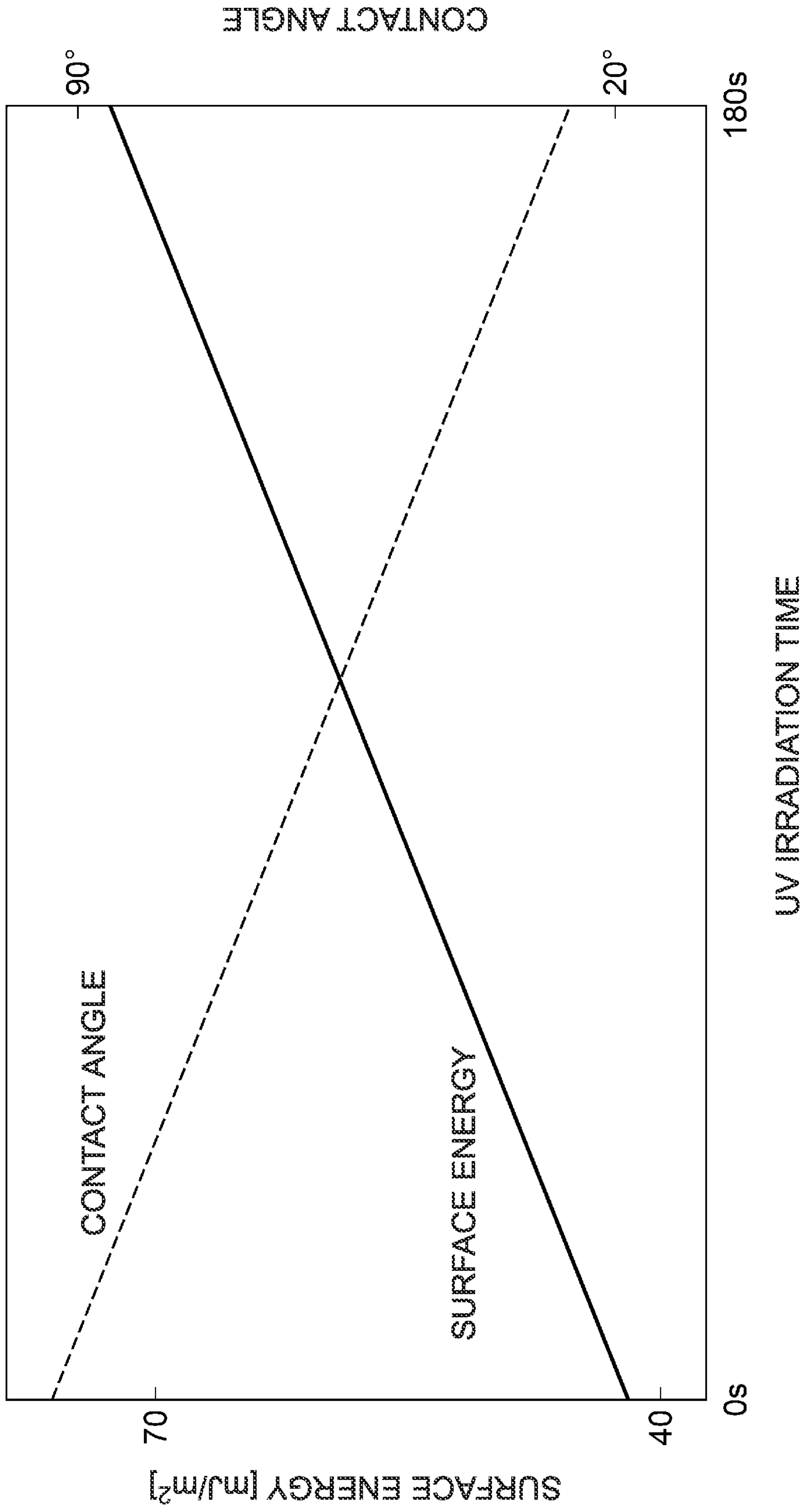
FIG. 3 is a schematic diagram showing the relationship between ultraviolet irradiation time and surface energy.

The surface modification method is, for example, an ultraviolet irradiation method using an ultraviolet irradiator. Ultraviolet light is hereinafter referred to as UV. FIG. 3 schematically shows the relationship between the UV irradiation time and the surface energy. FIG. 3 also shows change in contact angle. The contact angle is an indication related to surface energy. FIG. 3 schematically shows a change in surface energy when an ABS resin is irradiated with UV. For the UV irradiation, a UV cleaning surface-modifying apparatus ASM1101N manufactured by Asumi Giken, Limited was used. For the UV irradiation, ultraviolet rays having short wavelengths of 184.9 nm and 253.7 nm as main wavelengths were used. The contact angles were measured using a contact angle meter B100 manufactured by Asumi Giken, Limited. The contact angle was measured using 1.0 μL of water. The surface energy was calculated according to the Owens/Wendt theory, using contact angles measured by the contact angle meter.

As shown in FIG. 3, the surface energy is changed by UV irradiation. As the UV irradiation time is increased, the contact angle decreases and the surface energy increases proportionally. The increase in surface energy indicates an increase in hydrophilicity of the UV-irradiated ABS resin. As the hydrophilicity of the ABS resin increases, the wettability by water of the surface of the ABS resin increases, and thus the contact angle decreases. By performing the UV irradiation, the hydrophobicity of the hydrophobic resin decreases and the hydrophilicity increases. This is because hydrophilic groups are generated on the surface of the ABS resin by the UV irradiation. Further, the surface energy can be changed by changing the UV irradiation time. This is because the number of hydrophilic groups generated on the surface of the ABS resin can be changed by changing the UV irradiation time. In the present embodiment, a receiving surface having a surface energy distribution is generated by performing a process in which the UV irradiation time is changed for each of a plurality of positions on the surface.

The method of producing a receiving surface having a surface energy distribution is not limited to UV irradiation methods. For example, plasma treatment using plasma may be used for surface modification. Physical vapor deposition (PVD) treatment such as sputtering may be used for surface modification.

4. Configuration of the Collection Container 200

4.1. The Collection Container 200 of a First Embodiment

Figure 4:
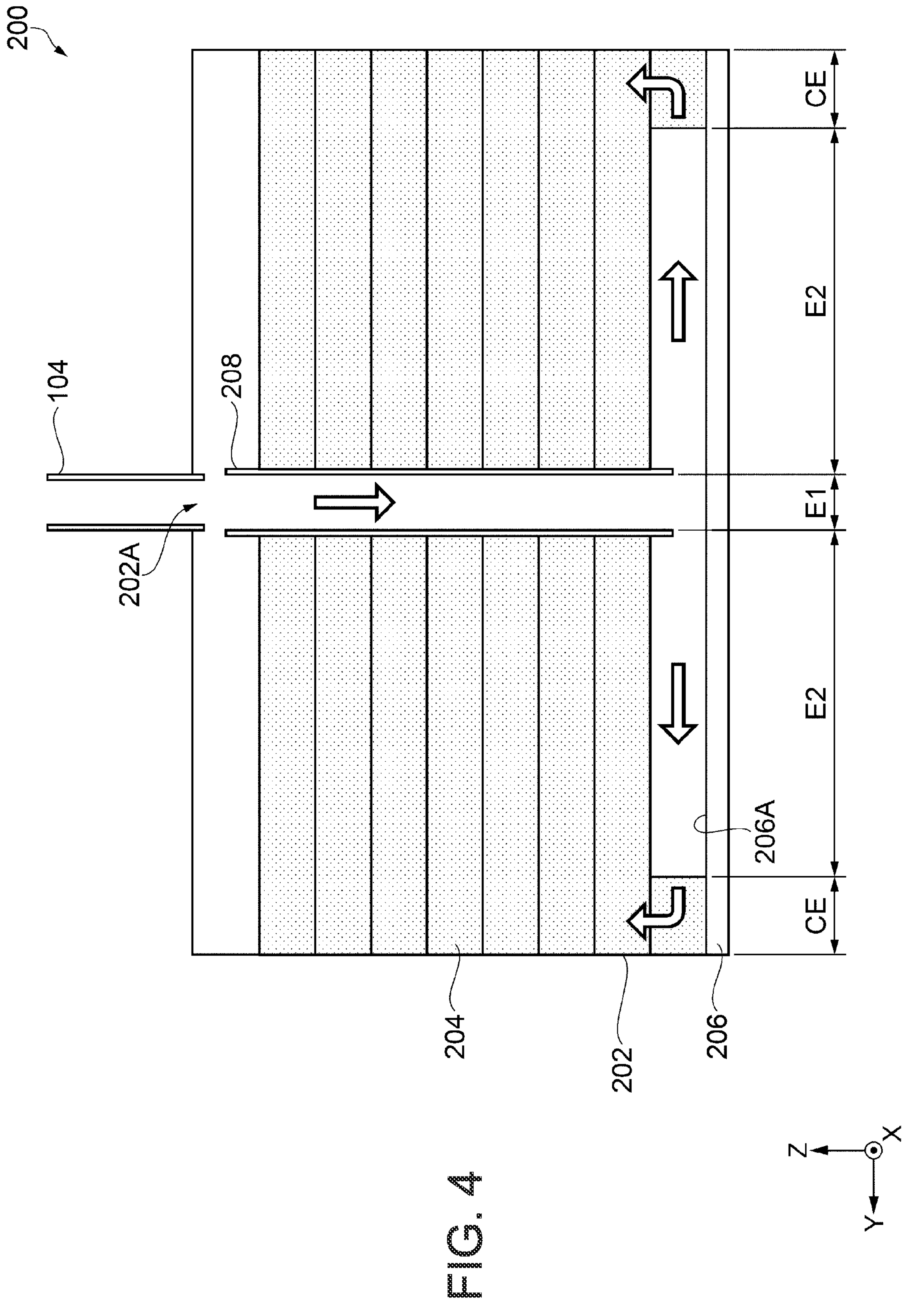
FIG. 4 is a view showing an example of a collection container.

FIG. 4 shows configuration of the collection container 200 of the first embodiment. FIG. 4 is a view of the collection container 200 viewed from the +X direction. The collection container 200 of FIG. 4 includes the housing 202 having an opening 202A and a bottom portion 206, an absorber 204, and a flow path tube 208 penetrating through the absorber 204.

The opening 202A provided in the housing 202 is connected to the tube 104. Ink flowing in the tube 104 drips into the housing 202 through the opening 202A. The opening 202A in FIG. 4 is provided at a position in the +Z direction of the housing 202. The opening 202A in FIG. 4 is provided at the widthwise center of the housing 202 along the Y-axis. The opening 202A in FIG. 4 is provided at the depth-wise center of the housing 202 along the X-axis.

The bottom portion 206 is provided at a position in the −Z direction of the housing 202 and constitutes a part of the housing 202. The bottom portion 206 corresponds to an example of a receiving member. The inner surface 206A of the bottom portion 206 faces the opening 202A and the tube 104 connected to the opening 202A. At least a portion of the inner surface 206A faces the absorber 204. A surface of the inner surface 206A other than the surface facing the absorber 204 may be in contact with the absorber 204. The inner surface 206A receives ink that dripped from the tube 104. The ink that dripped onto the inner surface 206A flows on the inner surface 206A. The inner surface 206A of the bottom portion 206 corresponds to an example of a receiving surface. The inner surface 206A has been subjected to UV irradiation treatment.

The absorber 204 is provided above the bottom portion 206 of the housing 202. Further, at least a part of the absorber 204 is provided on a path through which ink flows. The absorber 204 contacts the inner surface 206A at an outer peripheral region of the housing 202. The absorber 204 does not contact the inner surface 206A except at the outer peripheral region of the housing 202. A space is provided between the absorber 204 and the bottom portion 206. The space between the absorber 204 and the bottom portion 206 serves as a flow path for the ink, and the ink can flow on the inner surface 206A. The ink flows on the inner surface 206A as indicated by arrows shown in FIG. 4 and contacts the absorber 204. The ink that contacts the absorber 204 is absorbed by the absorber 204.

The flow path tube 208 is provided in the absorber 204 in the +Z direction with respect to the bottom portion 206. The flow path tube 208 forms an ink flow path through which ink that dripped from the tube 104 drips onto the inner surface 206A of the bottom portion 206. The flow path tube 208 is formed of, for example, a hollow cylindrical pipe. The flow path tube 208 corresponds to an example of a tube member. The flow path tube 208 is provided at a position facing the opening 202A of the housing 202. The diameter of the flow path tube 208 of the first embodiment is larger than the diameter of the tube 104. The flow path tube 208 prevents the ink that dripped from the tube 104 from directly dripping onto the absorber 204. The ink flow path formed by the flow path tube 208 corresponds to an example of a waste liquid passage section. As long as the flow path tube 208 has a configuration that allows the ink to drip onto the inner surface 206A and that prevents the dripping ink from being directly absorbed by the absorber 204, the member constituting the flow path tube 208 is not limited to the cylindrical pipe.

By providing the flow path tube 208 in the absorber 204, and a configuration wherein the ink flowing in the tube 104 passes through the flow path tube 208 and drips onto the inner surface 206A, the drip distance of the ink in the collection container 200 becomes long. After the ink drips onto the inner surface 206A due to the influence of gravity, the ink easily diffuses over the inner surface 206A.

In the inner surface 206A of the bottom portion 206, a region facing the flow path tube 208 is an ink drip region E1 where ink drips. The ink that dripped from the tube 104 passes through the flow path tube 208 as indicated by an arrow in FIG. 4, and drips onto the inner surface 206A in the ink drip region E1 of the inner surface 206A. The ink drip region E1 corresponds to an example of a first region. The ink that dripped onto the ink drip region E1 flows over an ink flow region E2 within the inner surface 206A. The ink flow region E2 is a region that does not overlap the flow path tube 208 when viewed from the +Z direction. The ink on the ink flow region E2 flows toward the absorber 204. In other words, the ink flows directly from the inner surface 206A toward the absorber 204. When the flowing ink contacts the absorber 204, the ink is absorbed by the absorber 204. The ink flow region E2 corresponds to an example of a second region. Note that as long as the ink can drip onto the inner surface 206A, the flow path tube 208 may not face the inner surface 206A.

Figure 5:
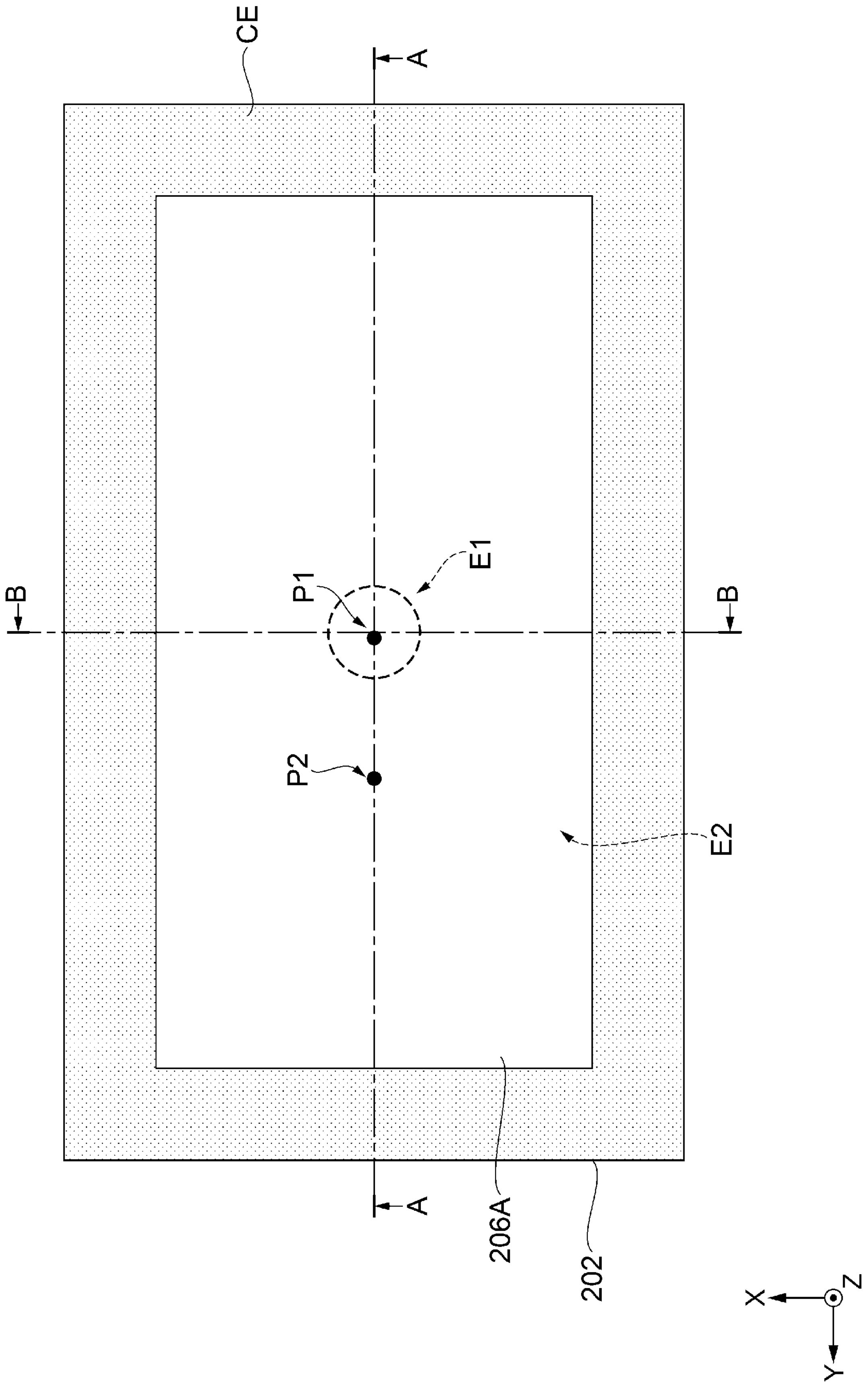
FIG. 5 is a diagram schematically illustrating an inner surface of a bottom portion viewed from a +Z direction.

FIG. 5 shows a schematic configuration when the inner surface 206A of the bottom portion 206 is viewed from the +Z direction. As shown in FIG. 5, the outer peripheral portion of the inner surface 206A is a contact region CE that contacts the absorber 204. The contact region CE corresponds to an example of a third region. As shown in FIG. 5, the ink drip region E1 is located at the center portion of the inner surface 206A. The ink flow region E2 is located at the outer periphery of the ink drip region E1. The contact region CE is located at the outer periphery of the ink flow region E2. That is, the ink drip region E1, the ink flow region E2, and the contact region CE are arranged in this order and are continuous with each other. Therefore, when the region of the inner surface 206A that contacts the absorber 204 is considered as the contact region CE, the ink flow region E2 is continuous with the ink drip region E1 and the contact region CE. The ink that flowed over the ink flow region E2 is absorbed by the absorber 204 at positions on the inner peripheral edge of the contact region CE. The inner surface 206A has undergone surface modification by UV irradiation.

Line A-A shown in FIG. 5 is an imaginary line that is parallel to the Y-axis and that passes through the center of the inner surface 206A. Line B-B shown in FIG. 5 is an imaginary line that is parallel to the X-axis and that passes through the center of the inner surface 206A. The position P1 indicates an arbitrary position on the line A-A in the ink drip region E1. The position P1 corresponds to an example of a first position in the first region. The position P2 indicates an arbitrary position on the line A-A in the ink flow region E2. The position P2 corresponds to an example of a second position in the second region.

Figure 6:
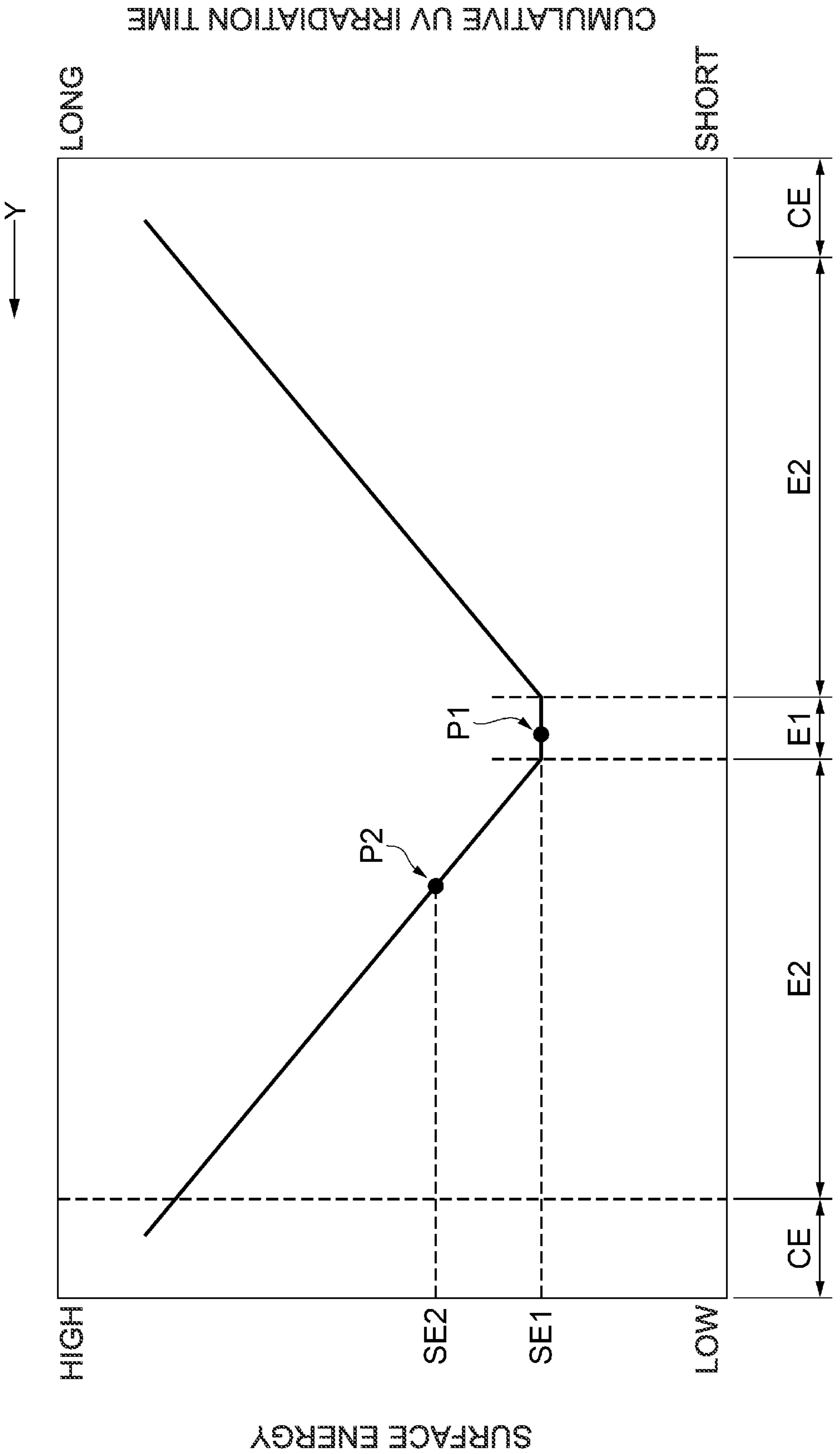
FIG. 6 shows a surface energy distribution of the inner surface.
Figure 7:
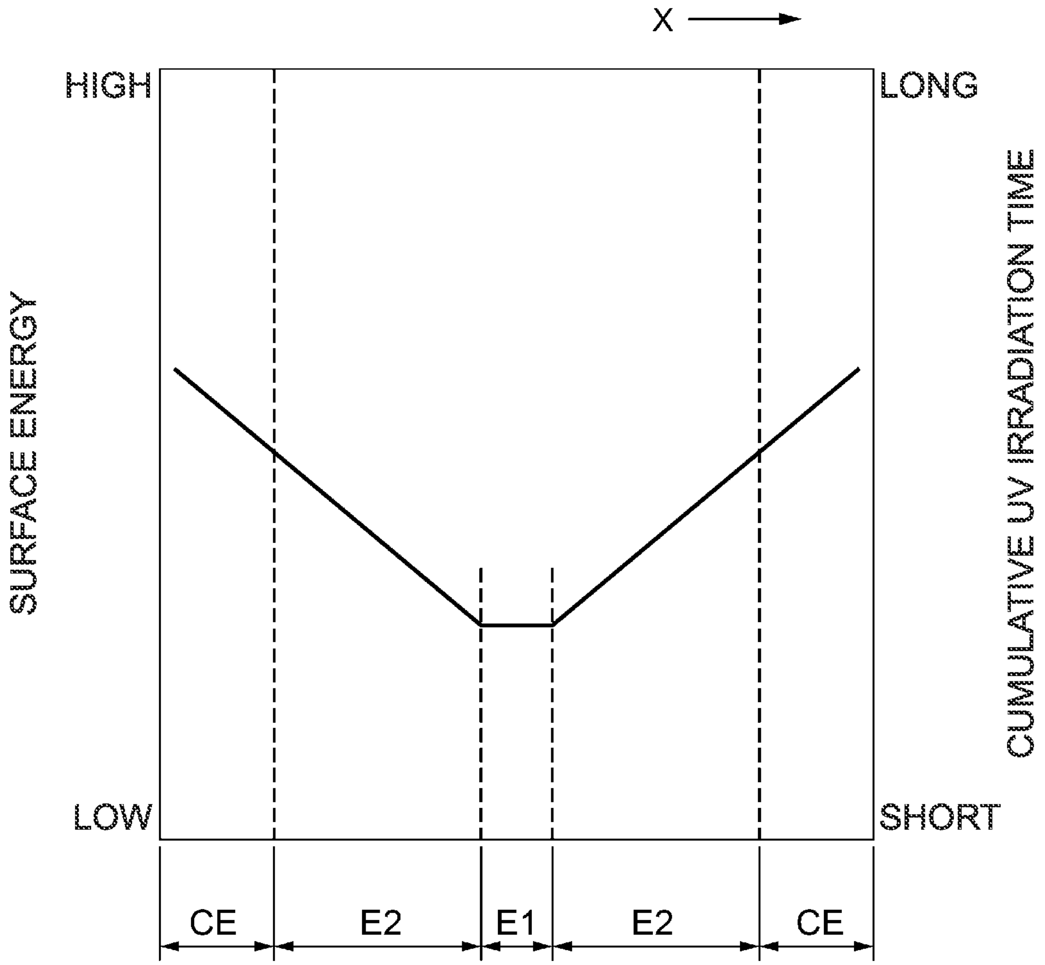
FIG. 7 schematically illustrates the surface energy distribution of the inner surface.

FIGS. 6 and 7 show surface energy distribution in the inner surface 206A of the bottom portion 206. FIG. 6 shows the surface energy at each position on the line A-A shown in FIG. 5. FIG. 7 shows the surface energy at each position on the line B-B shown in FIG. 5. As shown in FIGS. 6 and 7, the inner surface 206A is subjected to a UV irradiation treatment in which the cumulative UV irradiation time is changed depending on the position on the inner surface 206A. The ink drip region E1 of the inner surface 206A is masked and not subjected to UV irradiation treatment. As shown in FIG. 6, the ink flow region E2 is subjected to UV irradiation treatment in which the UV irradiation time is continuously increased in the +Y direction from the center and in the −Y direction from the center. As shown in FIG. 7, the ink flow region E2 is subjected to UV irradiation treatment in which the UV irradiation time is continuously increased in the +X direction from the center and in the −X direction from the center. For example, an operator irradiates the inner surface 206A with UV while moving the UV lamp or the collection container 200. An operator who processes the inner surface 206A changes the cumulative UV irradiation time depending on the position of the inner surface 206A by adjusting the moving speed of the UV lamp or of the collection container 200.

As shown in FIGS. 6 and 7, the surface energy changes according to the cumulative UV irradiation time. The surface energy at the ink drip region E1 of the inner surface 206A is the lowest. The surface energy of the ink flow region E2 continuously increases from the ink drip region E1 toward the outer peripheral surface of the housing 202.

FIGS. 6 and 7 show that the inner surface 206A of the bottom portion 206 has a surface energy distribution.

The ink that dripped from the tube 104 is received by the ink drip region E1 of the inner surface 206A. Since the ink drip region E1 is a hydrophobic region having a low surface energy, ink is less likely to adhere to it. The ink received by the ink drip region E1 easily flows from the ink drip region E1 to the ink flow region E2 due to the difference between the surface energy of the ink drip region E1 and the surface energy of the ink flow region E2. The ink in the ink drip region E1 flows to the ink flow region E2. Since the surface energy in the ink flow region E2 increases toward the absorber 204, the ink in the ink flow region E2 easily flows toward the absorber 204. The ink in the ink flow region E2 flows toward the absorber 204. As shown in FIGS. 6 and 7, the surface energy in the central portion of the inner surface 206A is lower than that of the outer peripheral portion of the inner surface 206A. The ink that dripped on the inner surface 206A easily flows toward the outer peripheral portion. The absorber 204 is provided in a state of being in contact with the contact region CE at the downstream side of the ink flow region E2 in the direction from the position P1 toward the position P2, that is, at the outer peripheral portion. Since the inner surface 206A is in contact with the absorber 204 at the outer peripheral portion, the region where the ink and the absorber 204 contact each other is wide. Therefore, the absorber 204 can efficiently absorb the ink.

As described above, the collection container 200 for collecting the ink ejected from the print head 26 that ejects the ink includes the bottom portion 206 having the inner surface 206A on which the ink drips, and the absorber 204 that absorbs the ink, the ink being capable of flowing on the inner surface 206A, and the inner surface 206A includes a surface energy distribution that enables the ink to flow toward the absorber 204.

Since the ink easily flows due to the surface energy distribution of the inner surface 206A, the collection container 200 can efficiently store the ink without being made large. Since the collection container 200 is not provided with a protrusion, the capacity of the collection container 200 does not become small.

Note that "surface energy distribution in which the ink can flow to the absorber 204" includes a surface energy distribution in which the traveling direction of the ink changes along the way when the ink flows over the inner surface 206A. For example, the surface energy distribution includes a surface energy distribution in which the ink flows on the inner surface 206A along an arc-shaped trajectory and a surface energy distribution in which the ink flows along a zigzag trajectory.

The printer 10 also includes the print head 26 that ejects ink, and the collection container 200 that collects ink ejected from the print head 26. The collection container 200 includes the bottom portion 206, which has the inner surface 206A on which ink drips, and the absorber 204 that absorbs ink. The ink is flowable on the inner surface 206A, and the inner surface 206A has a surface energy distribution for flowing the ink to the absorber 204.

Since the ink flows due to the surface energy distribution of the inner surface 206A, the printer 10 can efficiently store the ink without being made large. Since the printer 10 is not provided with a protrusion, the capacity of the collection container 200 does not become small.

FIG. 6 shows the position P1 and the position P2 shown in FIG. 5. FIG. 6 shows the surface energy SE1 at the position P1 and the surface energy SE2 at the position P2. The surface energy SE1 at the position P1 corresponds to an example of a first surface energy. The surface energy SE2 at the position P2 corresponds to an example of a second surface energy. The surface energy SE1 at the position P1 and the surface energy SE2 at the position P2 are different. The surface energy SE2 at the position P2 is higher than the surface energy SE1 at the position P1. By measuring the surface energy SE1 at the position P1 and the surface energy SE2 at the position P2, the measurer can confirm that the inner surface 206A has a surface energy distribution for flowing ink toward the absorber 204. That is, the surface energy distribution of the inner surface 206A is a distribution in which the surface energy SE2 is higher than the surface energy SE1.

As described above, the absorber 204 is provided on the bottom portion 206. The collection container 200 includes the flow path tube 208 that is provided in the absorber 204 and through which ink can pass. The flow path tube 208 faces the ink drip region E1 of the inner surface 206A. The inner surface 206A receives in an ink drip region E1 the ink that dripped and the ink flows in the ink flow region E2, which is different from the ink drip region E1. The surface energy distribution of the inner surface 206A is represented by the difference between the surface energy SE1 at the position P1 in the ink drip region E1 and the surface energy SE2 at the position P2 in the ink flow region E2. The surface energy SE2 at the position P2 is higher than the surface energy SE1 at the position P1.

Since the surface energy SE2 at the position P2 is higher than the surface energy SE1 at the position P1, the ink easily moves from the ink drip region E1, where the ink dripped, to the ink flow region E2.

Figure 8:
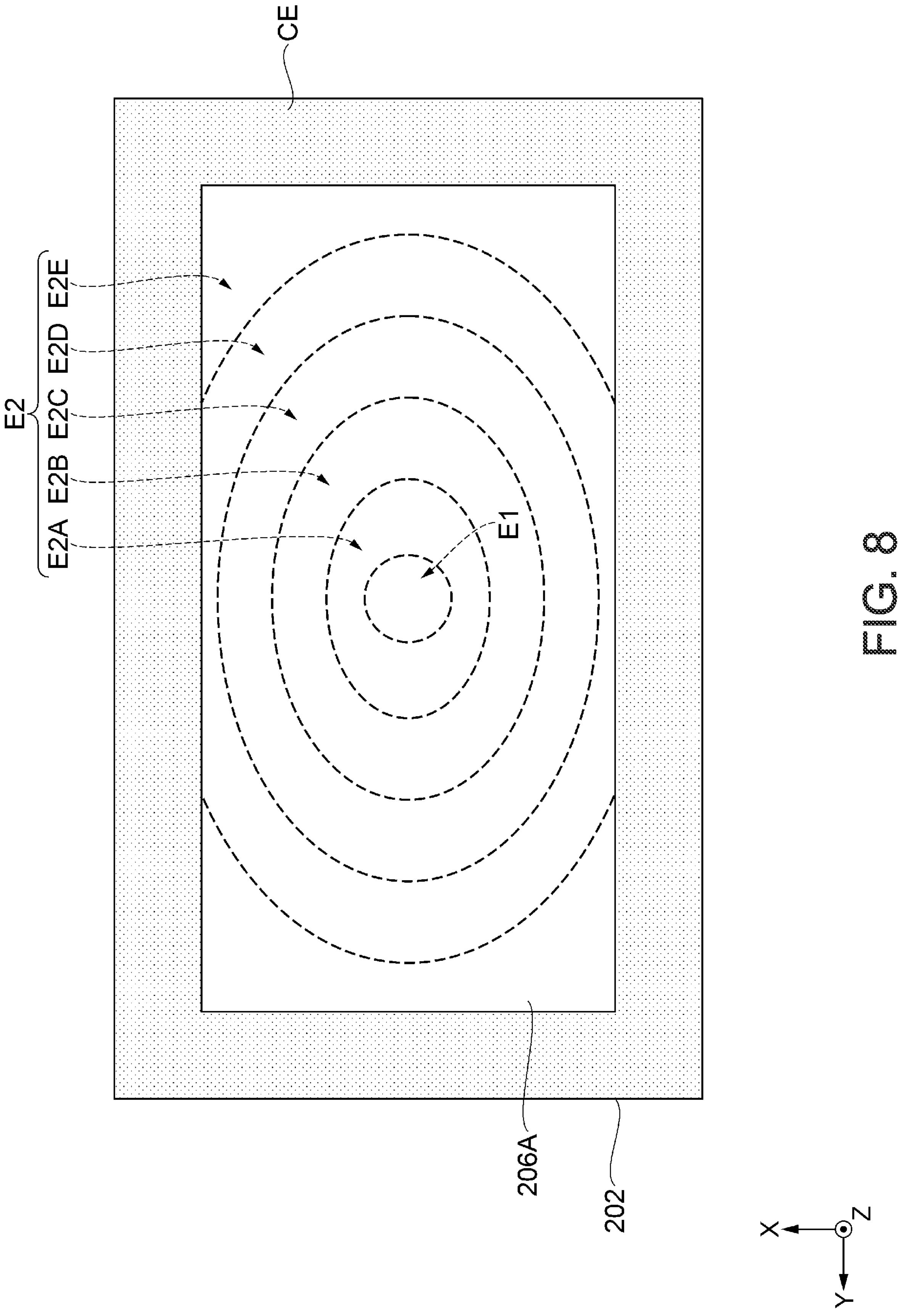
FIG. 8 schematically illustrates the inner surface having a surface energy distribution.

FIG. 8 shows an overview of the inner surface 206A, which has a surface energy distribution different from that of FIGS. 6 and 7. FIG. 8 shows the ink drip region E1, the ink flow region E2, and the contact region CE in the inner surface 206A. The ink flow region E2 includes a first section E2A, a second section E2B, a third section E2C, a fourth section E2D, and a fifth section E2E.

The first section E2A, the second section E2B, the third section E2C, the fourth section E2D, and the fifth section E2E indicate portions having different surface energies. The surface modification is performed so that the surface energies of the sections satisfy the following relationship:

$$SE1<SE2A<SE2B<SE2C<SE2D<SE2E$$

Here, the surface energy SE1 represents the surface energy in the ink drip region E1. The surface energy SE2A represents the surface energy within the first section E2A. The surface energy SE2B represents the surface energy within the second section E2B. The surface energy SE2C represents the surface energy within the third section E2C. The surface energy SE2D represents the surface energy within the fourth section E2D. The surface energy SE2E represents the surface energy within the fifth section E2E.

In the inner surface 206A shown in FIG. 8, the surface energy increases in five stages centered on the ink drip region E1 toward the outer periphery of the ink flow region E2. The collection container 200 provided with the surface-modified inner surface 206A shown in FIG. 8 can achieve the same effects as those of the collection container 200 provided with the inner surface 206A having the surface energy distribution shown in FIGS. 6 and 7.

Figure 9:
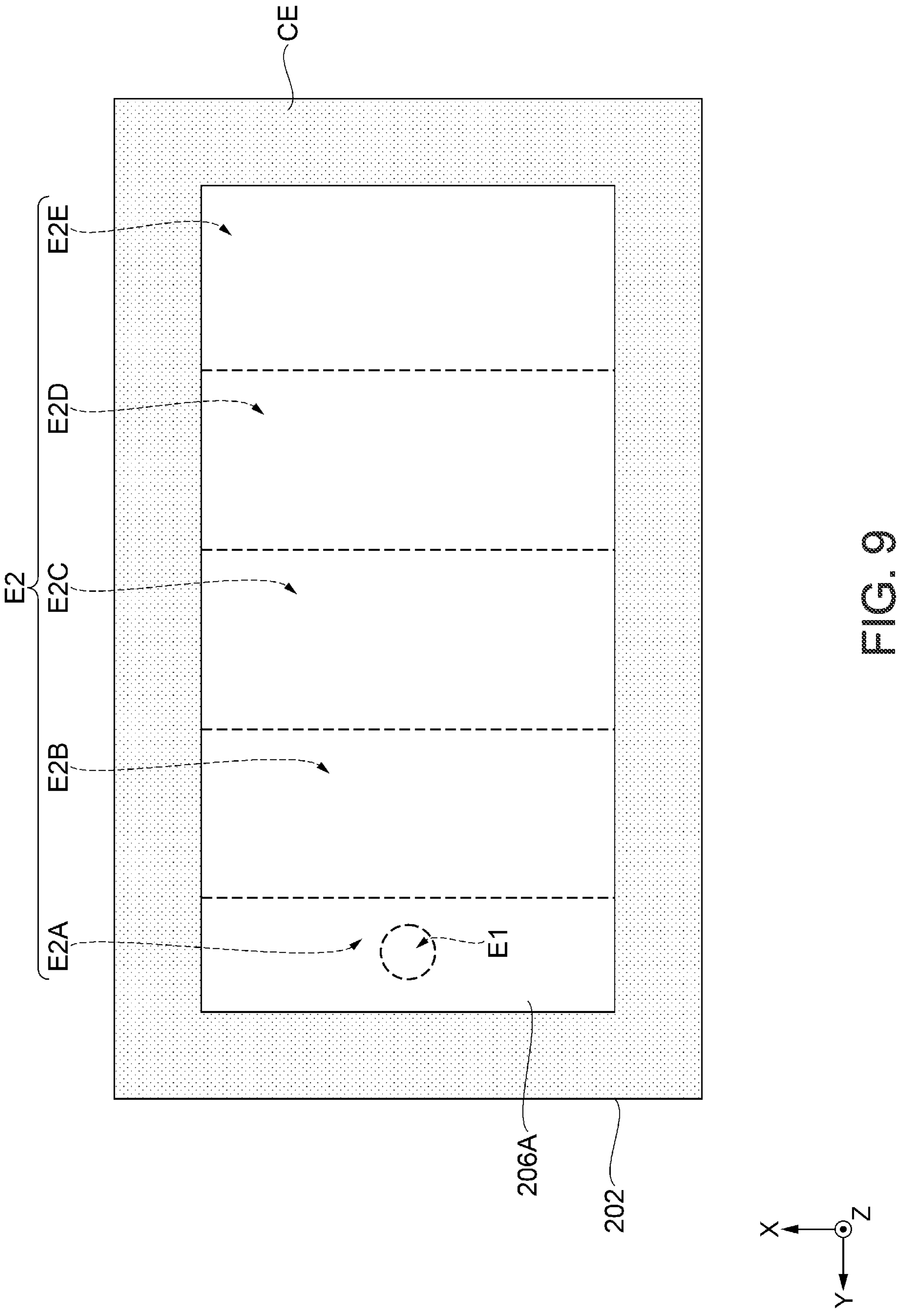
FIG. 9 schematically illustrates another inner surface having a surface energy distribution.

FIG. 9 shows an overview of an inner surface 206A having a surface energy distribution different from that of FIG. 8. In a manner similar to FIG. 8, FIG. 9 shows the ink drip region E1, the ink flow region E2, and the contact region CE in the inner surface 206A. The ink flow region E2 includes a first section E2A, a second section E2B, a third section E2C, a fourth section E2D, and a fifth section E2E. The surface energy of each portion is the same as in FIG. 8.

FIG. 9 shows a situation where the ink drip region E1 is provided in the vicinity of the contact region CE in the +Y direction. In the case of FIG. 9, the opening 202A of the housing 202 and the flow path tube 208 are provided at a position facing the ink drip region E1 of FIG. 9. The first section E2A, the second section E2B, the third section E2C, the fourth section E2D, and the fifth section E2E are aligned in this order in the −Y direction. The inner surface 206A shown in FIG. 9 allows the ink to easily flow in the −Y direction. By using the collection container 200 having the inner surface 206A shown in FIG. 9, the ink dripped from the tube 104 is received at the ink drip region E1 and flows in the −Y direction. The flowing ink is more easily absorbed by the absorber 204, which contacts the inner surface 206A in the −Y direction.

In the inner surfaces 206A shown in FIGS. 8 and 9, the ink flow region E2 is divided into five regions having different surface energies, but this is not a limitation. The surface energy the ink flow region E2 may be changed in four stages or less, or in six stages or more. The range of the difference is not limited as long as ink flow occurs due to the differences in the surface energies of the sections.

4.2. The Collection Container 200 of a Second Embodiment

Figure 10:
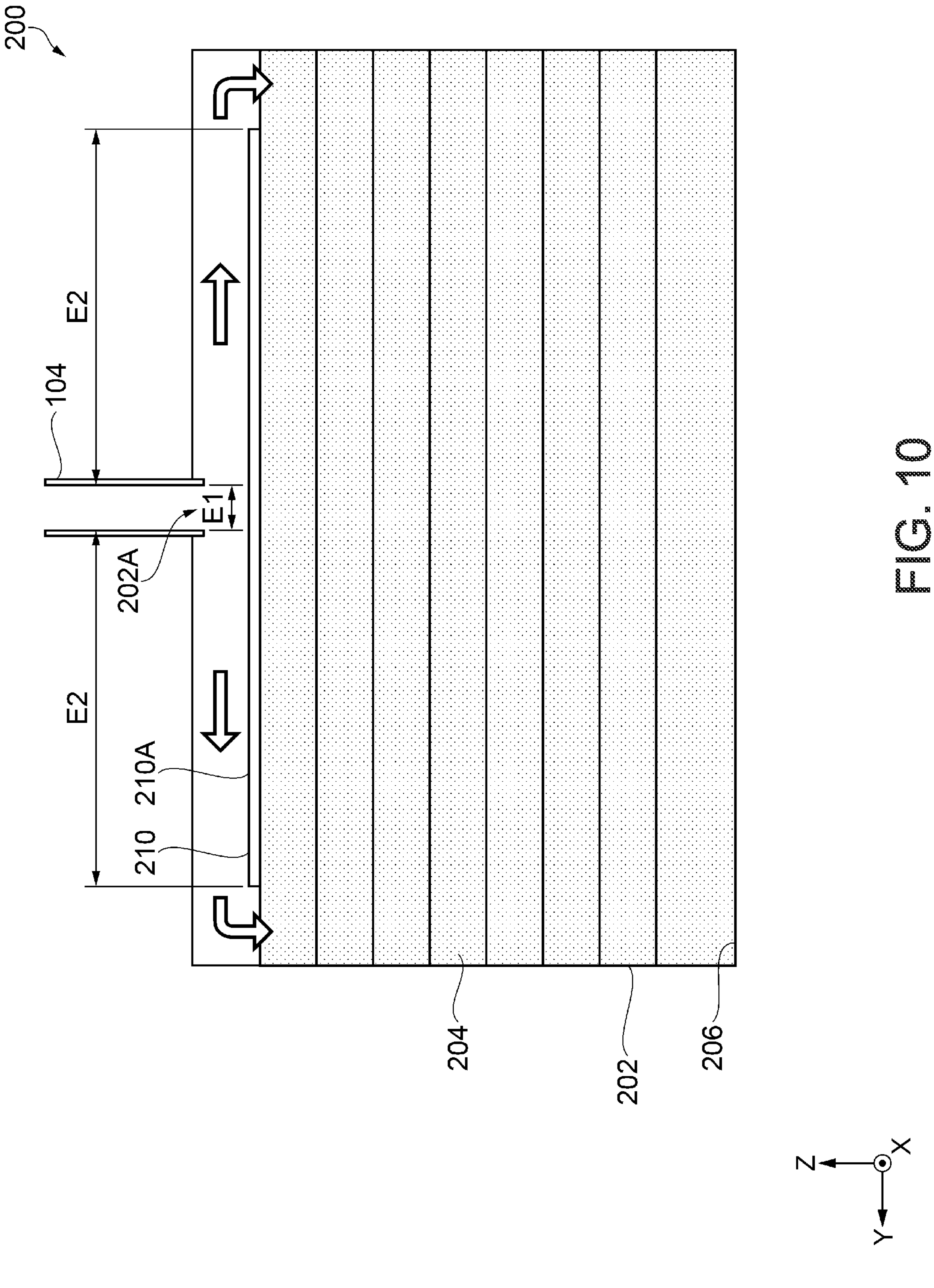
FIG. 10 shows an example of a collection container.
Figure 11:
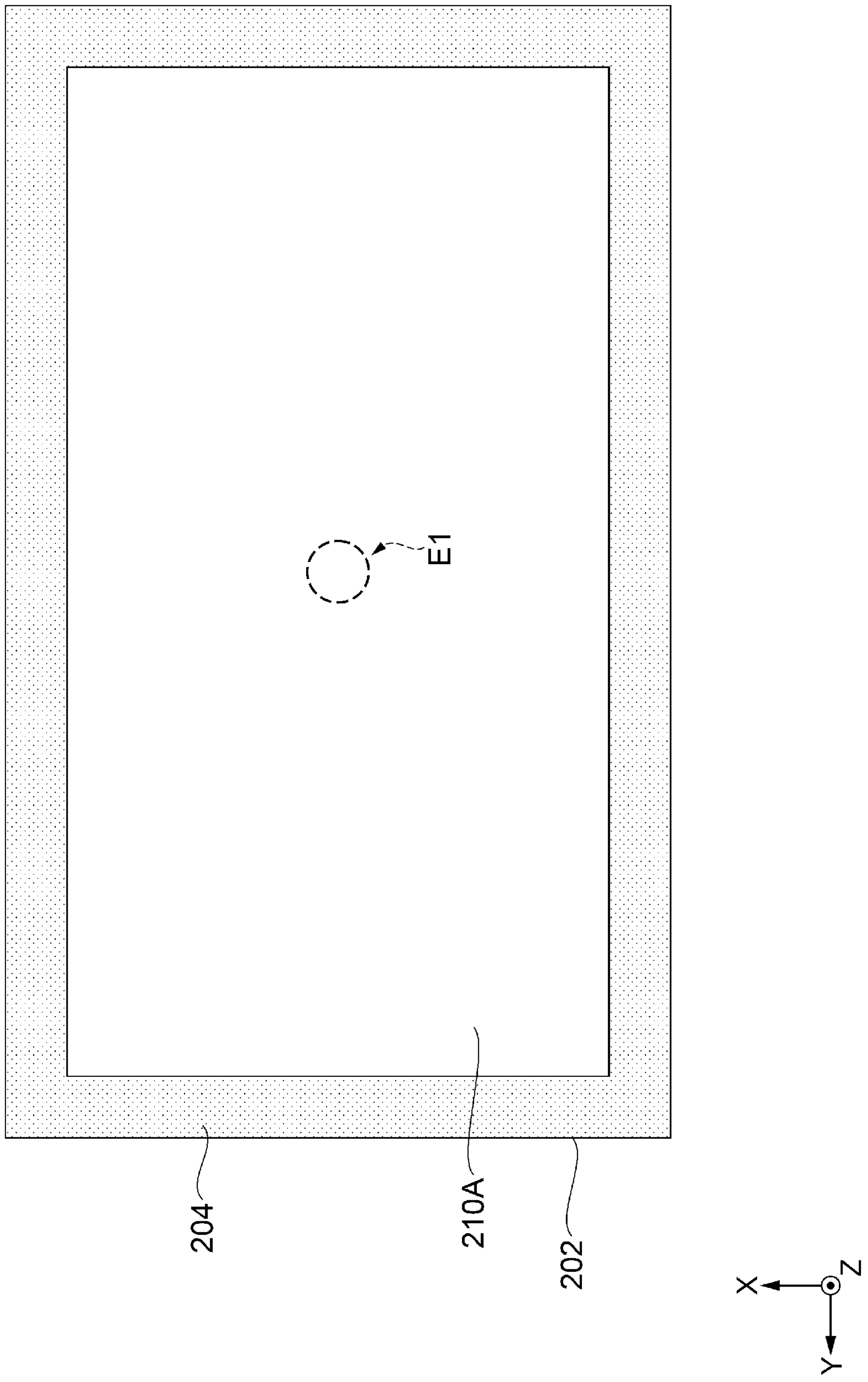
FIG. 11 is a diagram schematically illustrating a surface including a diffusion plate viewed from the +Z direction.

FIG. 10 shows configuration of a collection container 200 of a second embodiment. FIG. 10 is a view of the collection container 200 viewed from the +X direction. The collection container 200 of FIG. 10 includes a housing 202 having an opening 202A, an absorber 204, and a diffusion plate 210. FIG. 11 shows a schematic configuration of a surface including the diffusion plate 210 as viewed from the +Z direction.

The opening 202A provided in the housing 202 connects to the tube 104. The ink flowing in the tube 104 drips into the housing 202. The opening 202A of FIG. 10 is provided at the same position as the opening 202A shown in FIG. 4.

The absorber 204 is provided over the bottom portion 206 of the housing 202. Further, at least a part of the absorber 204 is provided on a path through which ink flows. No space is provided between the absorber 204 and the bottom portion 206.

The diffusion plate 210 is provided over the absorber 204. The diffusion plate 210 is provided between the opening 202A and the absorber 204. The diffusion plate 210 prevents the ink that dripped from the tube 104 from being directly received by the absorber 204. A space is provided between the diffusion plate 210 and the upper portion of the housing 202. The diffusion plate 210 includes a diffusion surface 210A that faces the tube 104 and the opening 202A and that receives ink that drips from the tube 104. The diffusion surface 210A corresponds to an example of a receiving surface. The diffusion plate 210 corresponds to an example of a receiving member. When viewed from the +Z direction, the edge portion of the diffusion plate 210 from which the ink flows out is positioned inward from the outer peripheral edge of the absorber 204. Note that the diffusion plate 210 may be disposed in a state of being separated in the +Z direction from the upper end of the absorber 204 in the +Z direction. That is, a space may be provided between the diffusion plate 210 and the absorber 204.

The diffusion plate 210 is made of a hydrophobic resin having high hydrophobicity. The hydrophobic resin is a polyolefin resin such as a polyethylene resin or a polypropylene resin, an ABS resin, or the like. The material of the diffusion plate 210 may be the same as or different from that of the housing 202.

As shown in FIG. 11, the width along the Y axis and the depth along the X axis of the diffusion plate 210 are smaller than the width along the Y axis direction and the depth along the X axis of the absorber 204. When viewed from the +Z direction, as shown in FIG. 11, the absorber 204 is exposed at the outer peripheral portion of the diffusion plate 210. In the case of the diffusion surface 210A, a region facing the tube 104 is the ink drip region E1. The region that does not face the tube 104 is an ink flow region E2.

The diffusion surface 210A of the diffusion plate 210 has the surface energy distribution shown in FIGS. 6 and 7. The diffusion surface 210A has a surface energy distribution up to the outer peripheral edge. The surface energy at the central portion of the diffusion surface 210A is lower than the surface energy at the outer peripheral portion of the diffusion surface 210A.

In the collection container 200 shown in FIG. 10, the ink flowing through the tube 104 drips onto the ink drip region E1 of the diffusion plate 210. The ink drip region E1 has low surface energy and a high hydrophobic property. Ink does not easily cling to the diffusion surface 210A in the ink drip region E1. The ink that dripped onto the ink drip region E1 flows over the ink flow region E2. Since the surface energy of the ink flow region E2 increases toward the outer peripheral portion, the ink easily flows toward the outer peripheral portion. The ink that has flowed to the outer peripheral portion of the diffusion surface 210A falls onto the absorber 204. In other words, the ink indirectly flows from the diffusion surface 210A toward the absorber 204. That is, the diffusion surface 210A has a surface energy distribution for flowing ink to the absorber 204. Therefore, the surface energy distribution may be any distribution as long as the ink flows from the dripping position of the ink on the diffusion plate 210 to the edge portion of the diffusion plate 210, which serves as an outlet portion for the ink to fall onto the absorber 204. The absorber 204 absorbs the ink that fell.

In the collection container 200 of FIG. 10, the ink is absorbed by the absorber 204 at the outer peripheral edge of the diffusion plate 210. Since the absorber 204 has a wide area for absorbing ink, the ink absorption efficiency is improved. Note that the ink may not be absorbed by the absorber 204 at the outer peripheral edge of the diffusion plate 210. For example, an opening may be provided in the ink flow region E2 of the diffusion surface 210A, and ink may fall from the opening so that ink is absorbed by the absorber 204 positioned along the path along which the ink flows.

Figure 12:
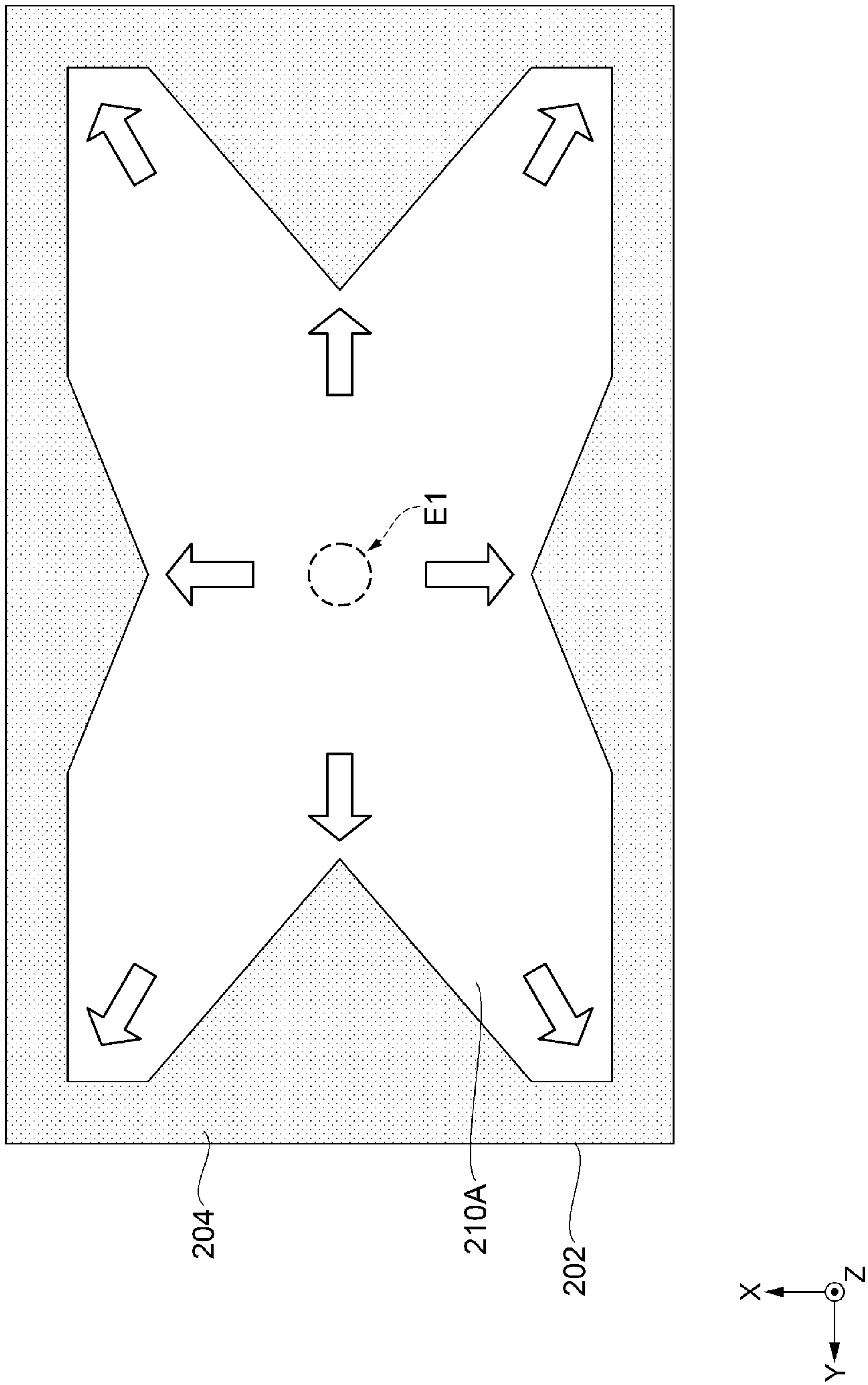
FIG. 12 is a diagram schematically illustrating a surface including a diffusion plate viewed from the +Z direction.

FIG. 12 schematically shows, as viewed from the +Z direction, a surface including a diffusion plate shaped differently from the diffusion plate 210 of FIG. 11. The diffusion plate 210 of FIG. 12 has a diffusion surface 210A with the same surface energy distribution as the diffusion plate 210 of FIG. 11. The shape of the outer peripheral edge of the diffusion plate 210 in FIG. 12 is a 5-gon or greater polygon. In the case of the diffusion plate 210 shown in FIG. 12, the distance from the central portion of the diffusion plate 210 toward the outer peripheral edge varies depending on the direction. When the ink flowing on the diffusion surface 210A of the diffusion plate 210 flows toward the outer peripheral portion, the ink is absorbed by the absorber 204 at different timings depending on the flowing direction. Because the shape of the diffusion plate 210, which has the diffusion surface 210A with the surface energy distribution, is polygonal, the collection container 200 can efficiently collect the ink.

4.3. The Collection Container 200 of a Third Embodiment

Figure 13:
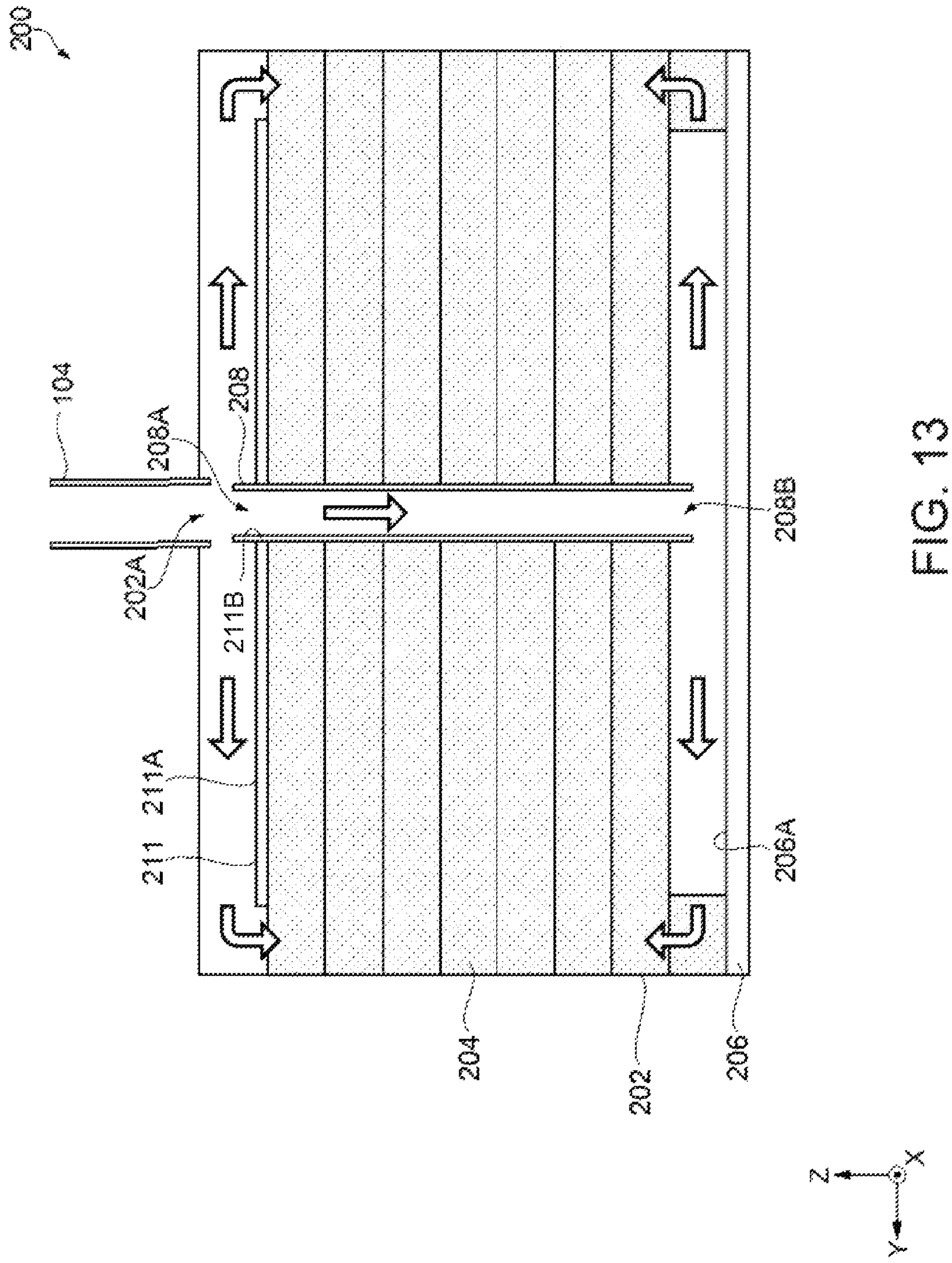
FIG. 13 shows an example of a collection container.

FIG. 13 shows configuration of a collection container 200 of a third embodiment. FIG. 13 is a view of the collection container 200 viewed from the +X direction. The collection container 200 shown in FIG. 13 includes a housing 202 having an opening 202A and a bottom portion 206, an absorber 204, a flow path tube 208 penetrating through the absorber 204, and a diffusion plate 211. The bottom portion 206 has an inner surface 206A. The diffusion plate 211 has a diffusion surface 211A.

The configuration of the opening 202A, the absorber 204, and the bottom portion 206 having the inner surface 206A, is the same as in the first embodiment. The inner surface 206A has the surface energy distribution shown in FIGS. 6 and 7. The inner surface 206A corresponds to an example of a receiving surface. The bottom portion 206 corresponds to an example of a receiving member.

The diffusion plate 211 shown in FIG. 13 is provided with an insertion port 211B at a position facing the tube 104. The flow path tube 208 is inserted through the insertion port 211B. The diffusion surface 211A has the surface energy distribution shown in FIGS. 6 and 7 except for the portion corresponding to the insertion port 211B. The surface energy distribution of the diffusion surface 211A may be the same as or different from the surface energy distribution of the inner surface 206A. The surface energy distribution of the diffusion surface 211A may be the same as that of the diffusion surface 211A of the second embodiment. The diffusion surface 211A corresponds to an example of a second receiving surface. The diffusion plate 211 corresponds to an example of a second receiving member. The surface energy distribution of the second receiving surface corresponds to an example of a second surface energy distribution.

The diameter of the flow path tube 208 of the third embodiment is different from the diameter of the flow path tube 208 of the first embodiment. As shown in FIG. 13, the diameter of the flow path tube 208 of the third embodiment is smaller than the diameter of the flow path tube 208 of the first embodiment. The diameter of an inlet 208A of the flow path tube 208 in FIG. 13 is smaller than that of the tube 104. When the diameter of the inlet 208A is smaller than the diameter of the tube 104, the ink that dripped from the tube 104 is received by the inner surface 206A and by the diffusion surface 211A. The ink drips onto and disperses over the inner surface 206A and the diffusion surface 211A.

The configuration of the flow path tube 208 is not limited to the configuration described above. The inner shape of the flow path tube 208 may be a semicircular shape. The inlet 208A of the flow path tube 208 may be disposed at a position partially overlapping the tube 104. The configuration of the flow path tube 208 is not limited as long as it is a configuration by which the ink that dripped is dispersed over the inner surface 206A and the diffusion surface 211A. A region where the inner surface 206A faces the outlet 208B of the flow path tube 208 is an ink drip region E1. Note that as long as the ink can drip onto the inner surface 206A, the outlet 208B of the flow path tube 208 does not have to face the inner surface 206A. A region where the diffusion surface 211A, other than the insertion port 211B, faces the tube 104 is an ink drip region E1.

The collection container 200 of FIG. 13 receives the ink that dripped from the tube 104 at the inner surface 206A and the diffusion surface 211A. The ink received by the inner surface 206A flows through the ink flow region E2 of the inner surface 206A as in the first embodiment. Since the inner surface 206A has a surface energy distribution, the ink easily flows on the inner surface 206A. The ink flowing on the inner surface 206A is absorbed by the absorber 204. The ink received by the diffusion surface 211A flows through the ink flow region E2 of the diffusion surface 211A as in the second embodiment. Since the diffusion surface 211A has a surface energy distribution, the ink easily flows on the diffusion surface 211A. The ink flowing on the diffusion surface 211A is absorbed by the absorber 204.

In the case of the collection container 200 shown in FIG. 13, ink is absorbed from above and below the absorber 204. Compared to the configuration of the collection container 200 in which the ink is absorbed from above or from below the absorber 204, there are many places where the ink is absorbed by the absorber 204. Therefore, the collection container 200 shown in FIG. 13 can collect ink more efficiently.

As indicated in the third embodiment, the collection container 200 includes the bottom portion 206 having the inner surface 206A on which ink can flow, and the diffusion plate 211 having the diffusion surface 211A on which ink can flow. The inner surface 206A and the diffusion surface 211A have surface energy distributions for flowing ink to the absorber 204.

By increasing the number of members that cause the dripped ink to flow, the speed at which the collection container 200 absorbs the ink can be increased. Since the number of positions where the absorber 204 absorbs ink is increased, it is easier to efficiently absorb waste liquid.

4.4. The Collection Container 200 of a Fourth Embodiment

Figure 14:
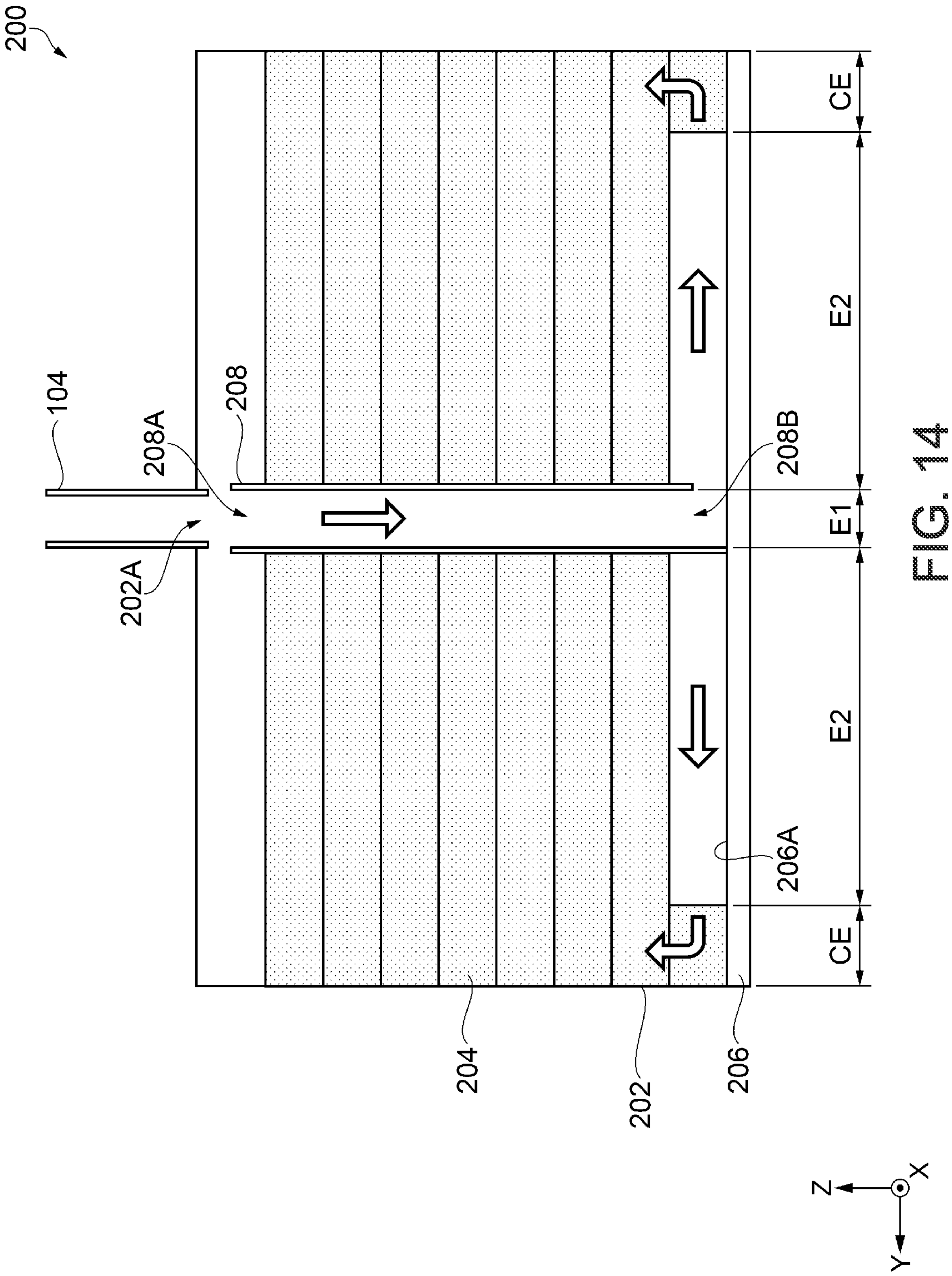
FIG. 14 shows an example of a collection container.

FIG. 14 shows configuration of a collection container 200 of a fourth embodiment. FIG. 14 is a view of the collection container 200 viewed from the +X direction. The collection container 200 shown in FIG. 14 has the same configuration as that of the collection container 200 of the first embodiment except for the configuration of the flow path tube 208.

The flow path tube 208 is provided with an inlet 208A and an outlet 208B. The inlet 208A faces the tube 104 and guides ink that dripped from the tube 104 into the flow path tube 208. The outlet 208B faces the inner surface 206A and guides the ink onto the inner surface 206A. The outlet 208B corresponds to an example of a first opening. The inlet 208A corresponds to an example of a second opening. In the outlet 208B shown in FIG. 14, a part of the flow path tube 208 protrudes toward the inner surface 206A side. The distal end of the flow path tube 208 constituting the outlet 208B has a pointed structure. The distal end structure of the flow path tube 208, in which a portion of the flow path tube 208 protrudes, corresponds to an example of a pointed section.

FIG. 15 is an enlarged view of the distal end structure at the outlet 208B side of the flow path tube 208. The flow path tube 208 has a protruding end 208C where a part of the flow path tube 208 protrudes to the inner surface 206A side. The protruding end 208C shown in FIG. 15 is separated from the inner surface 206A. Further, a portion of the flow path tube 208 closer to the outlet 208B than to the inlet 208A is tapered. For example, a portion of the flow path tube 208 closer to the outlet 208B than to the inlet 208A is tapered toward the inner surface 206A side. Note that as long as the ink can drip onto the inner surface 206A, the protruding end 208C may not face the inner surface 206A. FIG. 15 shows the outflow opening diameter R1 of the outlet 208B. The flow path tube 208 is configured to have the same diameter from the tip portion on the inlet 208A side to a region portion penetrating through the absorber 204. FIG. 15 shows the inflow opening diameter R2 of the inlet 208A. As shown in FIG. 15, the outflow opening diameter R1 is larger than the inflow opening diameter R2. Thus, the area of the outlet 208B is larger than the area of the inlet 208A. By increasing the area of the outlet 208B to be larger than the area of the inlet 208A, the ink easily flows out from the flow path tube 208 to the inner surface 206A. The area of the outlet 208B corresponds to an example of the area of a first opening. The area of the inlet 208A corresponds to an example of the area of a second opening.

As shown in the fourth embodiment, the flow path tube 208 is a hollow cylindrical pipe. One end of the flow path tube 208 is a pointed section having a shape tapered toward the inner surface 206A, and an outlet 208B from which ink can flow out is provided in the pointed section. The other end of the flow path tube 208 is provided with the inlet 208A into which ink can flow. The area of the outlet 208B is larger than area of the inlet 208A.

Therefore, the ink is less likely to pool up in the pointed section, and the ink is more likely to be absorbed by the absorber 204.

Although the protruding end 208C shown in FIG. 15 is separated from the inner surface 206A, this is not a limitation. The protruding end 208C may contact the inner surface 206A. At this time, at least a part of the protruding end 208C is processed so that its surface energy is lower than the surface energy SE1 at position P1 of the ink drip region E1. As an example, a coating of polytetrafluoroethylene (PTFE) is applied to the protruding end 208C. As a result, the surface energy SE3 at the protruding end 208C is lower than the surface energy SE1 at the position P1. By increasing the hydrophobic property of the protruding end 208C, the ink is less likely to pool up in the vicinity of the protruding end 208C. The treatment of the protruding end 208C is not limited to coating with PTFE. The method is not limited as long as the surface energy SE3 of the protruding end 208C is lower than the surface energy SE1 at the position P1. The surface energy SE3 of the protruding end 208C corresponds to an example of a third surface energy.

As described above, the protruding end 208C is in contact with the inner surface 206A. The surface energy SE3 at the protruding end 208C is lower than the surface energy SE1 at the position P1.

Due to the structure of the flow path tube 208, the ink easily flows from the flow path tube 208 to the inner surface 206A, and the ink does not easily pool up at the drip position.

Note that the configuration of the flow path tube 208 is not limited to the configuration described above. For example, the flow path tube 208 may be formed from a member that is not hollow. In this case, in the protruding end 208C of the flow path tube 208 that protrudes toward the inner surface 206A side, a process that makes the surface energy lower than the surface energy SE1 at the position P1 may be performed on at least a part of the path through which the ink flows.

In addition, the region of the flow path tube 208 through which ink flows, from a portion close to the inlet 208A toward a portion close to the outlet 208B, may be divided up and the surface energy increased in stages. For example, when the flow path tube 208 is provided horizontally, or when the tip of the flow path tube 208 constituting the outlet 208B is provided at the opposite side from the inner surface 206A, the ink in the flow path tube 208 cannot obtain a thrust force toward the inner surface 206A by gravity, and is less likely to drip on the inner surface 206A. On the other hand, by making a difference in surface energy in the portion of the flow path tube 208 where the ink flows from the portion close to the inlet 208A toward the portion close to the outlet 208B, it is possible to generate a thrust force toward the inner surface 206A in the ink in the flow path tube 208, and it is possible to suppress the ink from being less likely to drip on the inner surface 206A. Note that the range of the difference is not limited as long as ink flow occurs due to the differences in surface energies of the regions.

Contents derived from the embodiment will be described below.

A waste liquid container for collecting waste liquid ejected from a liquid ejection head that ejects liquid, includes a receiving member that has a receiving surface on which the waste liquid drips and a waste liquid absorbing member configured to absorb the waste liquid, wherein the waste liquid is flowable over the receiving surface and the receiving surface has a surface energy distribution for flowing the waste liquid to the waste liquid absorbing member.

With this configuration, since the waste liquid easily flows due to the surface energy distribution of the receiving surface, the waste liquid container can efficiently store the waste liquid without being made large. Since the waste liquid container does not have a protrusion, the capacity of the waste liquid container does not become small.

It is desirable that the waste liquid container described above further includes a waste liquid passage section that is disposed in the waste liquid absorbing member and through which the waste liquid is passable, wherein the waste liquid absorbing member is disposed over the receiving member, the waste liquid passage section faces a first region of the receiving surface, the receiving surface receives the waste liquid dripped in the first region and causes the waste liquid to flow in a second region, which is different from the first region, when a region of the receiving surface in contact with the waste liquid absorbing member is a third region, the second region is continuous with the first region and with the third region, and when a surface energy at a first position in the first region is a first surface energy and a surface energy at a second position in the second region is a second surface energy, the surface energy distribution is a distribution in which the second surface energy is higher than the first surface energy.

According to this configuration, since the second surface energy at the second position is higher than the first surface energy at the first position, the liquid easily moves from the first region where the liquid dripped to the second region.

It is desirable that in the above-described waste liquid container, the waste liquid passage section is a hollow tube member, one end of the tube member includes a pointed section having a tapered shape, the pointed section has a first opening from which the waste liquid is flowable, another end of the tube member has a second opening into which the waste liquid is flowable, and an area of the first opening is larger than an area of the second opening.

According to this configuration, the liquid is less likely to pool up at the pointed section, and the liquid is more likely to be absorbed in the waste liquid container.

In the above-described waste liquid container, it is desirable that the pointed section is in contact with the receiving surface and when a surface energy of the pointed section is a third surface energy, the third surface energy is lower than the first surface energy.

According to this configuration, due to the structure of the waste liquid passage section, the liquid easily flows from the waste liquid passage section to the receiving surface, and the liquid is less likely to stay in the first region.

It is desirable that the above-described waste liquid container includes a second receiving member having a second receiving surface over which the waste liquid is flowable, wherein the second receiving surface has a second surface energy distribution for flowing the waste liquid to the waste liquid absorbing member.

According to this configuration, it is possible to increase the speed at which the waste liquid container absorbs the liquid by increasing the number of second receiving members that cause the liquid that dripped to flow. Also, since the number of positions where the waste liquid absorbing member absorbs the liquid increases, the liquid is easily absorbed efficiently.

A liquid ejecting apparatus includes a liquid ejection head that ejects liquid and a waste liquid container for collecting waste liquid ejected from the liquid ejection head, wherein the waste liquid container includes a receiving member that has a receiving surface on which the waste liquid drips and a waste liquid absorbing member configured to absorb the waste liquid, the waste liquid is flowable over the receiving surface and the receiving surface has a surface energy distribution for flowing the waste liquid to flow to the waste liquid absorbing member.

With this configuration, since liquid ejecting apparatus causes flow due to the surface energy distribution of the receiving surface, liquid ejecting apparatus can efficiently store the waste liquid without being made large. Since the liquid ejecting apparatus is not provided with a protrusion, the capacity of the waste liquid container does not become small.

What is claimed is:

1. A waste liquid container for collecting waste liquid ejected from a liquid ejection head that ejects liquid, the waste liquid container comprising:

a receiving member that has a receiving surface on which the waste liquid drips, the receiving member being disposed in an interior of a housing of the waste liquid container; and a waste liquid absorbing member that is different from the receiving surface and that is configured to absorb the waste liquid, wherein the waste liquid is flowable over the receiving surface, and the receiving surface has a surface energy distribution for flowing the waste liquid to the waste liquid absorbing member.

2. The waste liquid container according to claim 1, further comprising:

a waste liquid passage section that is disposed in the waste liquid absorbing member and through which the waste liquid is passable, wherein the waste liquid absorbing member is disposed over the receiving member, the waste liquid passage section faces a first region of the receiving surface, the receiving surface receives the waste liquid dripped in the first region and causes the waste liquid to flow in a second region, which is different from the first region, when a region of the receiving surface in contact with the waste liquid absorbing member is a third region, the second region is continuous with the first region and with the third region, and when a surface energy at a first position in the first region is a first surface energy and a surface energy at a second position in the second region is a second surface energy, the surface energy distribution is a distribution in which the second surface energy is higher than the first surface energy.

3. The waste liquid container according to claim 2, wherein the waste liquid passage section is a hollow tube member, one end of the tube member includes a pointed section having a tapered shape, the pointed section has a first opening from which the waste liquid is flowable, another end of the tube member has a second opening into which the waste liquid is flowable, and an area of the first opening is larger than an area of the second opening.

4. The waste liquid container according to claim 3, wherein the pointed section is in contact with the receiving surface and when a surface energy of the pointed section is a third surface energy, the third surface energy is lower than the first surface energy.

5. The waste liquid container according to claim 1, further comprising:

a second receiving member having a second receiving surface over which the waste liquid is flowable, wherein the second receiving surface has a second surface energy distribution for flowing the waste liquid to the waste liquid absorbing member.

6. A liquid ejecting apparatus, comprising:

a liquid ejection head that ejects liquid; and a waste liquid container for collecting waste liquid ejected from the liquid ejection head, wherein the waste liquid container includes:

a receiving member that has a receiving surface on which the waste liquid drips, the receiving member being disposed in an interior of a housing of the waste liquid container, and a waste liquid absorbing member that is different from the receiving surface and that is configured to absorb the waste liquid, the waste liquid is flowable over the receiving surface, and the receiving surface has a surface energy distribution for flowing the waste liquid to the waste liquid absorbing member.

* * * * *